United States Patent [19]
Shibata et al.

[11] Patent Number: 5,467,718
[45] Date of Patent: Nov. 21, 1995

[54] MAGNETIC LEVITATION TRANSPORT SYSTEM WITH NON-CONTACT INDUCTIVE POWER SUPPLY AND BATTERY CHARGING

[75] Inventors: Satoru Shibata; Shigeto Murayama, both of Komaki, Japan

[73] Assignee: Daifuku Co., Ltd., Osaka, Japan

[21] Appl. No.: 93,791

[22] Filed: Jul. 19, 1993

[30] Foreign Application Priority Data

| Jul. 20, 1992 | [JP] | Japan | 4-191897 |
| Jul. 20, 1992 | [JP] | Japan | 4-191898 |
| Jul. 21, 1992 | [JP] | Japan | 4-192585 |
| Jul. 21, 1992 | [JP] | Japan | 4-192586 |
| Jul. 24, 1992 | [JP] | Japan | 4-197342 |

[51] Int. Cl.$^6$ ................................. B61B 13/08
[52] U.S. Cl. ................... 104/284; 104/286; 104/293; 336/115; 336/129; 191/10
[58] Field of Search .................. 104/281, 284, 104/286, 290, 293, 294; 191/10; 336/115, 117, 118, 129, 178; 323/347

[56] References Cited

U.S. PATENT DOCUMENTS

| 5,058,505 | 10/1991 | Vehira | 104/284 |
| 5,207,304 | 5/1993 | Lechner et al. | 191/10 |
| 5,282,424 | 2/1994 | O'Neill | 104/282 |
| 5,293,308 | 3/1994 | Boys et al. | 363/37 |
| 5,317,976 | 6/1994 | Aruga et al. | 104/284 X |

FOREIGN PATENT DOCUMENTS

| 0179188 | 4/1985 | European Pat. Off. | B65G 54/02 |
| 179188 | 4/1986 | European Pat. Off. | |
| 246098 | 11/1987 | European Pat. Off. | |
| 0246098 | 11/1987 | European Pat. Off. | B65G 54/02 |
| 216401 | 12/1984 | Japan . | |
| 290104 | 11/1990 | Japan | 191/10 |
| 3251003 | 11/1991 | Japan . | |
| 402483 | 7/1974 | U.S.S.R. | 191/10 |
| WO9217929 | 10/1992 | WIPO | H02B 5/00 |
| 9217929 | 10/1992 | WIPO . | |
| 9324343 | 12/1993 | WIPO | 191/10 |

OTHER PUBLICATIONS

"A Linear Induction Motor Control System for Magnetically Levitated Carrier System"; IEEE Transactions; New York, N.Y., May 1989, pp. 102–108; by: Azukizawa.
"Inductive Power Transfer to an Electrical Vehicle–Analytical Model"; 40th IEEE Conference, Orlando Fla., May 1990, pp. 100–104, by: Eghtesadi.
"Grand Transportation Energy Transfer"; Ward et al, 4th Intersociety Eenrgy Conversion Conference; Wash. D.C., Sep. 1969, pp. 778–794.
"The M–Bahn Mag–Lev Rapid Transit System . . . " Int. Conference on Mag–Lev Linear Drives; Las Vegas, Nev., May 1987, pp. 113–118, by: Dreimann.
40th IEEE Vehicular Technology Conference, May 1990, Orlando, Fla., pp. 100–104, Monochehr Eghtesadi, "Inductive Power Transfer To An Electrical Vehicle — Analytical Mode–" p. 100.
Proceedings of the Fourth Intersociety Energy Conversion Engineering Conference, Sep. 1969, Washington, D.C., pp. 778–794, E. J. Ward et al., "Ground Transportation Energy Transfer" p. 783; FIG. 15.
Patent Abstracts of Japan, vol. 016, No. 047, (M–1208), Feb. 6, 1992 and JP–A–03 251 003 (Sumitomo Electric Ind. Ltd.)

(List continued on next page.)

Primary Examiner—Robert J. Oberleitner
Assistant Examiner—S. Joseph Morano
Attorney, Agent, or Firm—Webb Ziesenheim Bruening Logsdon Orkin & Hanson

[57] ABSTRACT

A magnetic levitation transport system includes magnetic levitation vehicles each driven by a linear motor to run along a track. Induction lines extend through predetermined blocks of the running track to transmit a high frequency sine-wave current. Each vehicle includes electromagnets to attract levitating magnetic members extending along the running track, a pickup coil resonant with a frequency of the induction lines to generate an electromotive force, and a battery chargeable by the pickup coil. The electromagnets receive power from the pickup coil and/or the battery.

16 Claims, 22 Drawing Sheets

OTHER PUBLICATIONS

Nov. 8, 1991 Abstract International Conference on Maglev and Linear Drives, May 1987, Bally's Las Vegas, pp. 113–118, Karl Dreimann "The M–Bahn Vaglev Rapid Transit System — Technology, Status, Experience–" pp. 114–115 FIGS. 3 & 4.

IEEE Transactions on Vehicular Technology, vol. 38, No. 2, May 1989, New York U.S., pp. 102–108, XP99587 Teruo Azukizawa, "A Linear Induction Motor Control System For Magnetically Levitated Carrier System" FIG. 1.

Patent Abstracts of Japan, Vol. 009, No. 092, (M–373), Apr. 20, 1985 and JP–A–59 216 401 (Hitachi Seisakusho K.K.), Dec. 6, 1984, Abstract.

MAGNETIC LEVITATION TRANSPORT SYSTEM WITH NON-CONTACT INDUCTIVE POWER SUPPLY AND BATTERY CHARGING

BACKGROUND OF THE INVENTION

1. Field of the Invention

This invention relates to magnetic levitation transport systems, and more particularly to a magnetic levitation transport system having vehicles lifted by a magnetic force generating device which attracts magnetic members extending along a running track, and propelled by a linear motor to transport loads.

2. Description of the Related Art

A conventional magnetic levitation transport system will be described with reference to FIGS. 21 through 23. This system includes a load carrying vehicle A lifted and propelled along a guide rail B defining a running track in a cleanroom. The vehicle A is magnetically levitated, and driven by a linear motor to move from one loading and unloading station ST to another.

The guide rail B includes a main body B1 formed by extrusion molding a non-magnetic material such as aluminum. The main body B1 is in the shape of a square tube, with an upper surface defining an opening extending longitudinally of the rail B. The main body B1 has magnetic members 3 attached to lower sides of the upper surface. The magnetic members 3 extend along the upper opening and are spaced from each other transversely of the main body B1. The vehicle A has levitating electromagnets 2 disposed under and attracting the magnetic members 3, respectively. The vehicle A is movable along the guide rail B, with a main body A1 of the vehicle A disposed inside the main body B1 of the rail B. The guide rail B further includes primary coils 5 of a linear motor mounted in the bottom thereof.

As shown in FIG. 23, the primary coils 5 are arranged at intervals along the guide rail B to decelerate and stop the vehicle A at each station ST and to start and accelerate the vehicle A.

The main body B1 of the guide rail B contains stopping electromagnets 7 in positions opposed to each station ST. These electromagnets 7 attract, from below, stopping magnetic members 8 attached to the vehicle A to maintain the vehicle A at a standstill. The magnetic members 8 are arranged in the front and rear and right and left corners of the vehicle A. Thus, four electromagnets 7 are arranged in place to act on the respective magnetic members 8.

The vehicle A includes a flat load supporting deck 15 disposed on top. The levitating electromagnets 2 are arranged in the front and rear and right and left corners of the vehicle A to act as magnetic force generating means for attracting the levitating magnetic members 3 from below. The vehicle A further includes a secondary conductor 6 formed of a non-magnetic material such as aluminum to act on the primary coils 5 of the guide rail B. The secondary conductor 6 is supported in horizontal posture in a lower region of the vehicle A, with a transversely middle position thereof attached to a prop 6b depending from a transversely middle position of the main body A1 of the vehicle A. The guide rail B supports magnetic plates 6c arranged only in positions where the primary coils 5 are present. The secondary conductor 6 is movable through spaces defined between the magnetic plates 6c and upper surfaces of the primary coils 5. Thrust is applied to the vehicle A when the secondary conductor 6 passes through these spaces.

The levitating electromagnets 2 are electrified by a battery 10 mounted on the main body A1 of the vehicle A. As a result, upper surfaces of the levitating electromagnets 2 are maintained within a predetermined range of distance from lower surfaces of the levitating magnetic members 3 based on information provided by gap sensors (not shown). The stopping electromagnets 7 are electrified only when maintaining the vehicle A at a standstill at the station ST.

In FIG. 21, reference W1 denotes guide rollers for maintaining vertical spacing between the levitating electromagnets 2 and magnetic members 3 when the electromagnets 2 are de-electrified. Reference W2 denotes guide rollers for maintaining a smaller transverse spacing between the vehicle A and guide rail B than a predetermined value, to prevent the vehicle A from colliding with inner lateral surfaces of the levitating magnetic members 3.

The known magnetic levitation transport system has the disadvantage of having to change or charge the battery 10 every five to six hours, which impairs operating efficiency of the vehicle A. Moreover, the battery 10 must be subjected to maintenance periodically.

In order to overcome these disadvantages, it is conceivable to lay along the guide rail B a power rail formed of a conductive material such as copper, and provide the vehicle A with a collector to contact and receive power from the power rail to charge the battery 10. With such a construction, however, maintenance is imperative since the power rail and collector become worn through contact. Further, this construction would produce wastes such as abrasion dust, and cannot therefore be used in a cleanroom.

SUMMARY OF THE INVENTION

An object of the present invention is to overcome the disadvantages of the prior art noted above, and provide a magnetic levitation transport system which does not require change of batteries over a long period of time, thereby to secure improved operating efficiency, and which may be used in a cleanroom.

The above object is fulfilled, according to the present invention, by a magnetic levitation transport system comprising a magnetic levitation vehicle, lines extending through predetermined blocks of a running track of the vehicle to transmit a high frequency sine-wave current therethrough, wherein the vehicle includes a levitating magnetic force generating device to attract levitating magnetic members extending along the running track, a pickup coil resonant with a frequency of the lines to generate an electromotive force, and a battery chargeable by the pickup coil, the levitating magnetic force generating device receiving power from the pickup coil and/or the battery.

With the above construction, an electromotive force is generated in the pickup coil when power (alternating current) is supplied to the lines extending through the predetermined blocks of the track. As a result, the vehicle receives power in a non-contact mode while running through these blocks of the track, with the battery charged, and power supplied to the levitating magnetic force generating device. When the vehicle runs along the track other than the predetermined blocks, the levitating magnetic force generating device receives power from the battery.

As noted above, the present invention allows an electromotive force to be generated in the pickup coil by supplying power (alternating current) to the lines extending through the predetermined blocks of the track. The vehicle may receive power in a non-contact mode and the battery may be charged as well while the vehicle runs through these blocks of the track. Consequently, it is no longer necessary to change the battery every five to six hours as is the case with the prior art. This feature improves operating efficiency and drastically reduces the time consumed in maintenance since the battery need not be changed for at least one year. Power may be supplied to the vehicle regardless of its running direction.

The levitating magnetic force generating device may include electromagnets and permanent magnets. This provides the advantage of allowing the electromagnets to be excited with reduced currents and to be compact.

According to the present invention, a vehicle propelled along a guide rail may include a magnetic force generating device having electromagnets and permanent magnets for generating magnetic forces with levitating magnetic members included in the guide rail to levitate the vehicle, and a control device for controlling the magnetic forces, in which the electromagnets and permanent magnets are arranged opposite the levitating magnetic members, respectively.

With this construction in which the electromagnets and permanent magnets constituting the magnetic force generating device mounted on the vehicle are arranged opposite the levitating magnetic members, respectively, the permanent magnets are not incorporated into magnetic circuits of the electromagnets, thereby avoiding increased magnetic resistance in the magnetic circuits.

Thus, this construction avoids reduced efficiency of the electromagnets occurring where the permanent magnets are joined to intermediate positions or opposite ends of yokes each supporting a pair of electromagnets.

Each of the permanent magnets may be formed cylindrical to surround one of the electromagnets.

With each cylindrical permanent magnet surrounding one of the electromagnets, large areas are secured opposite the levitating magnetic members to produce sufficient magnetic forces, which allow the entire magnetic force generating device to be compact.

An adjusting device may be provided for adjusting a relative position between the permanent magnets and electromagnets in directions toward and away from the levitating magnetic members.

With the permanent magnets and electromagnets adjustable relative to each other in directions toward and away from the levitating magnetic members, a relative position may be selected according to the weight of a load to enable diminishment of the exciting currents supplied to the electromagnets. For example, where the vehicle has permanent magnets capable of generating sufficient magnetic forces to cope with a heavy load placed on the vehicle, the permanent magnets may be moved relative to the electromagnets away from the levitating magnetic members, when the load is light, to diminish the attractive forces acting between the permanent magnets and magnetic members. In this way, a rough adjustment of the necessary attractive forces may be carded out by varying the relative position between the permanent magnets and electromagnets according to the weight of the load. This enables a reduced range of adjustment of the necessary attractive forces produced by the electromagnets, which in turn realizes diminished exciting currents supplied to the electromagnets.

More advantageously, the adjusting device may be automatically operable to move the permanent magnets relative to the electromagnets closer to the levitating magnetic members with the heavier load placed on the vehicle.

The vehicle may further include a gap detecting device for detecting a gap between the vehicle and guide rail, the control device being operable to control the magnetic forces such that a value detected by the gap detecting device becomes a predetermined value.

That is, the magnetic forces of the levitating magnetic members are controllable such that a gap between the vehicle and guide rail, e.g. a detection value of the gap detecting device for detecting the gap between the vehicle and guide rail, corresponds with a predetermined value. In this case, even when a load has an increased weight, the relative position between the permanent magnets and electromagnets is varied to maintain the gap constant and to check an increase in the exciting currents supplied to the electromagnets.

Further, the vehicle may include a current detecting device for detecting the exciting currents supplied to the electromagnets, the control device being operable, in response to detection information received from the current detecting device, to control the magnetic forces such that the exciting currents become zero steady level.

With this construction, the magnetic forces are controllable based on detection information received from the current detecting device for detecting the exciting currents supplied to the electromagnets, to bring the exciting currents to zero steady level. In this case, even when a load has a varied weight, the relative position between the permanent magnets and electromagnets is varied to bring the exciting currents close to zero steady level without substantially varying the gap between the vehicle and guide rail.

Consequently, in the magnetic levitation transport system in which permanent magnets are used alongside the electromagnets in the magnetic force generating device of the vehicle in order to diminish the exciting currents supplied to the electromagnets, the exciting currents are diminished while maintaining the gap between the vehicle and guide rail in a proper range despite variations in the weight of the load.

The levitating magnetic members may be magnetized substantially at fight angles to a running direction of the vehicle, and the vehicle may include a control device for controlling magnetic forces of the electromagnets constituting the magnetic force generating device, the control device being operable to control electrification of the electromagnets such that magnetic forces acting between the electromagnets and levitating magnetic members may be switched between attractive forces and repulsive forces.

With this construction, since the levitating magnetic members are magnetized substantially at right angles to a running direction of the vehicle, not only attractive forces but also repulsive forces may be generated between the electromagnets on the vehicle and the levitating magnetic members. That is, with the control device operable to control electrification of the electromagnets (e.g. to switch polarity of the exciting currents), the magnetic forces acting between the electromagnets and levitating magnetic members may be switched between attractive forces and repulsive forces. When, for example, the electromagnets and levitating magnetic members have moved too close to each other, the magnetic forces acting therebetween are switched to repulsive forces for a very brief time. This prevents the electromagnets and levitating magnetic members from moving closer to each other by inertia, and promptly restores a proper gap therebetween.

This construction effectively checks and quickly damps vertical vibrations of the vehicle, compared with the magnetic forces acting between the electromagnets and levitating magnetic members being used only as attractive forces, and separation thereof being dependent on a natural descent which is made possible by weakening the attractive forces.

In another aspect of the present invention, a magnetic levitation transport system comprises a magnetic force generating device for levitating the vehicle above the guide rail, a levitated state detecting device for detecting a difference between a predetermined proper levitated state and an actual levitated state provided by the levitating force of the magnetic force generating device, a levitation control device operable in response to detection information received from the levitated state detecting device to control the levitating force of the magnetic force generating device, thereby to maintain the predetermined proper levitated state, a propelling force generating device for applying a forward or backward propelling force to the vehicle along the guide rail, and a propelling force control device for controlling the propelling force generating device.

With this construction, the magnetic force generating device lifts the vehicle out of contact with the guide rail, and the propelling force generating device such as a linear induction motor (LIM) propels the vehicle along the guide rail. In this way, the vehicle may transport a load efficiently and smoothly from one station to another.

Advantageously, this magnetic levitation transport system may further comprise a state value detecting device for detecting a state value variable with variations in weight of the vehicle, the propelling force control device being operable in response to detection information received from the state value detecting device to control the forward or backward propelling force.

With this construction, the levitation control device controls the magnetic force generating device based on detection information from the levitated state detecting device, to maintain the vehicle in a proper levitated state above the guide rail. At the same time, the propelling force control device controls the forward or backward propelling force based on detection information from the state value detecting device which is variable with the weight of the vehicle including the load.

The levitated state detecting device may be operable to detect a difference between a predetermined proper gap and an actual gap between the vehicle and guide rail, the levitation control device may be operable to control the levitating force of the magnetic force generating device to bring the actual gap to the proper gap, and the state value detecting device may be operable to detect the levitating force of the magnetic force generating device.

With this construction, the levitation control device controls the levitating force of the magnetic force generating device, so that the gap between the vehicle and guide rail detected by the levitated state detecting device becomes a predetermined proper gap. That is, the levitating force of the magnetic force generating device is varied according to the weight of the vehicle including a load. The levitated state detecting device detects this levitating force, and the propelling force control device controls the forward or backward propelling force based on the detection information from the state value detecting device. The levitating force of the magnetic force generating device may be detected from energy supplied to the magnetic force generating device, e.g. the exciting currents supplied to the electromagnets where levitating forces are generated by the magnetic forces of the electromagnets.

This construction provides the advantage that the forward or backward propelling force may be controlled with nicety according to an actual weight of the vehicle including a load.

The levitated state detecting device may be operable to detect a difference between a predetermined proper value and energy supplied to the levitating magnetic force generating device and to detect variations in the gap between the vehicle and guide rail, the levitation control device may be operable to control the levitating force of the magnetic force generating device to bring the energy supplied to the magnetic force generating device to the predetermined proper value in the absence of variations in the gap, and the state value detecting device may be operable to detect the gap.

With this construction, the levitation control device is operable, in response to a difference between the predetermined proper value and energy supplied to the levitating magnetic force generating device and variations in the gap between the vehicle and guide rail as detected by the levitated state detecting device, to control the levitating force of the magnetic force generating device such that the energy supplied to the magnetic force generating device be the predetermined proper value in the absence of variations in the gap (in a steady state). Where, for example, levitating forces are generated by the magnetic forces of electromagnets, the exciting currents for the electromagnets are controlled to be a predetermined proper value in a steady state. By using permanent magnets as well, the exciting currents for the electromagnets may be reduced to zero in a steady state.

In this case, the levitating force of the magnetic force generating device is varied for a transient period according to the weight of the vehicle including a load, to vary and maintain the gap to balance the weight. The state value detecting device detects this gap, and the propelling force control device controls the forward or backward propelling force based on detection information from the state value detecting device.

Where, for example, the propelling force generating device is a linear induction motor (LIM), the control of the forward or backward propelling force is carried out by varying an effective voltage applied to primary coils according to the weight. In a stopping control, a transfer function gain is varied according to the weight when the backward propelling force is subjected to feedback control based on a distance to a stopping position and speed of the vehicle.

A state value corresponding to a weight may be obtained by utilizing a device required for the levitation control. That is, the state value detecting device may be used also as part of the levitated state detecting device for detecting the gap between the vehicle and guide rail.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Magnetic levitation transport systems according to the present invention will be described in detail hereinafter with reference to the drawings.

Figure 21:
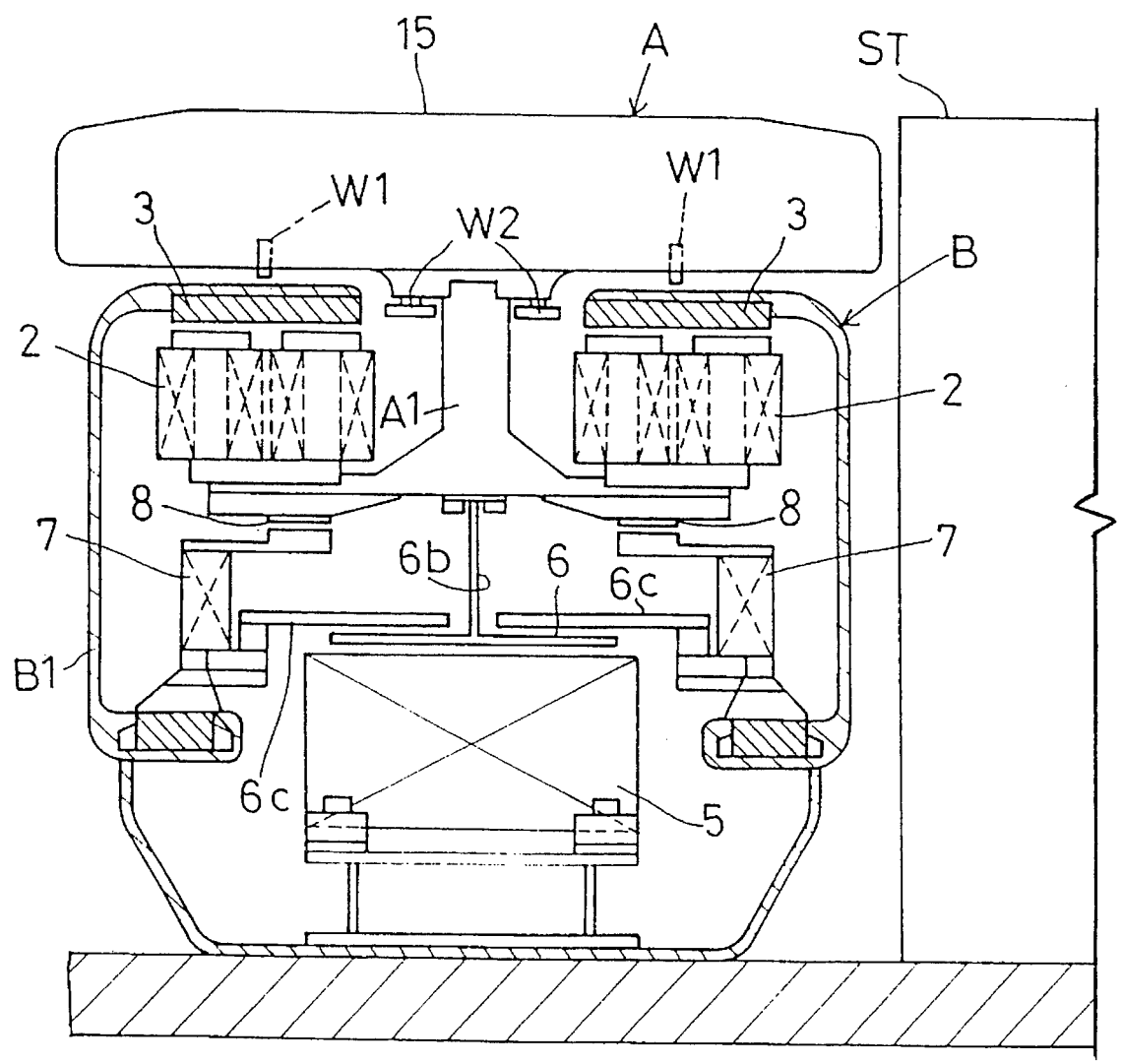
FIG. 21 is a front view of a conventional magnetic levitation transport system.
Figure 22:
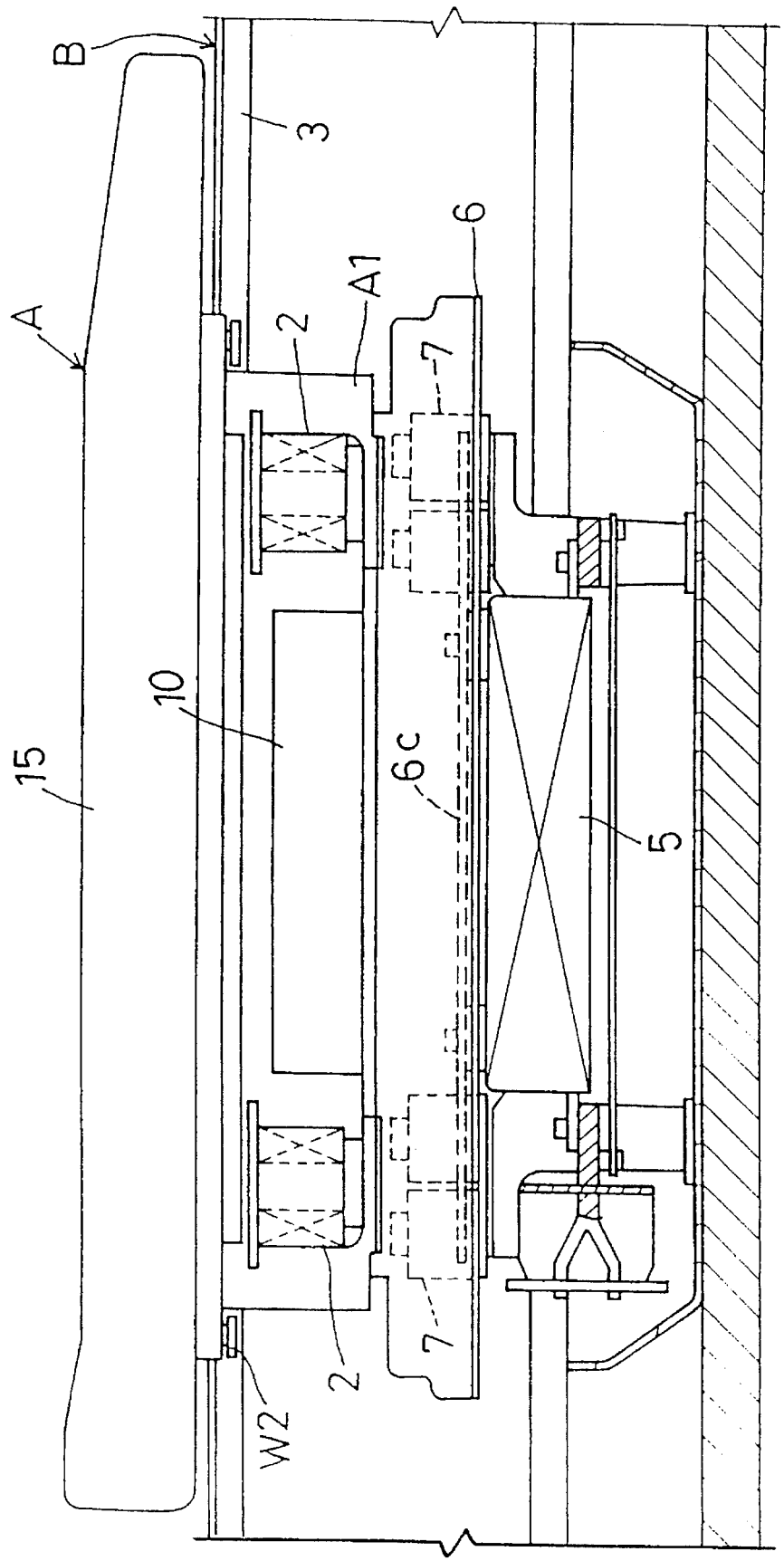
FIG. 22 is a sectional side view of the conventional magnetic levitation transport system.
Figure 23:
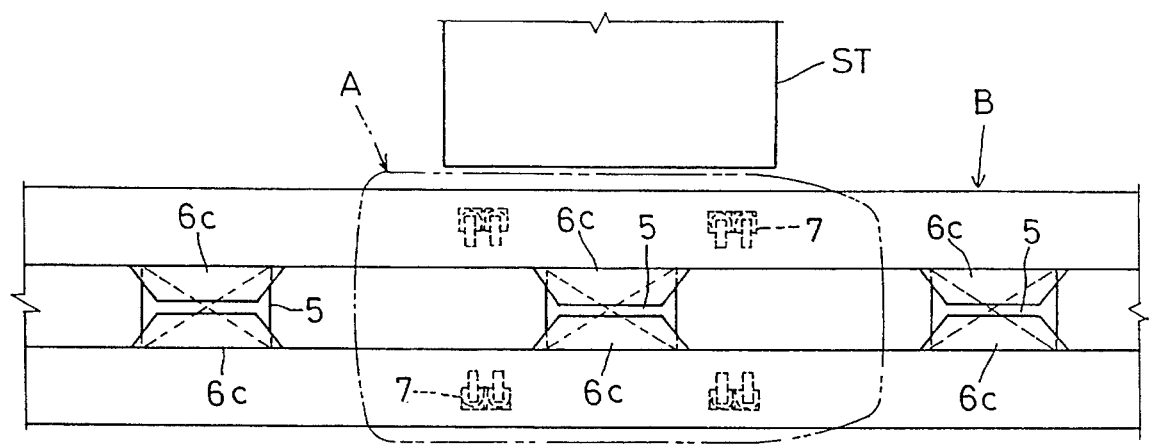
FIG. 23 is a schematic plan view showing a layout of a guide rail in the conventional magnetic levitation transport system.

Like reference numerals are used to identify like parts in FIGS. 21 through 23 showing the prior art, which will not be described again.

Figure 1:
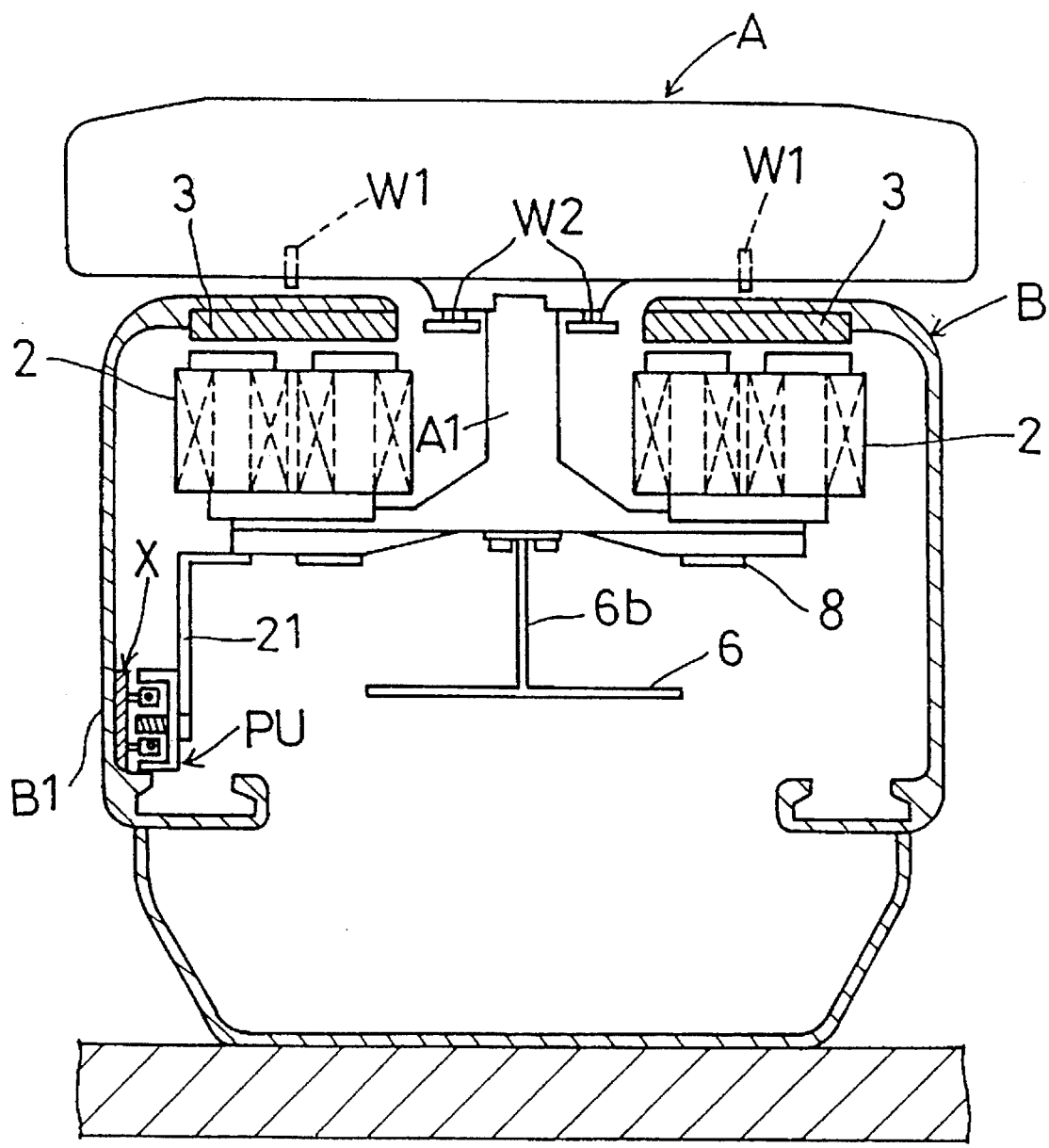
FIG. 1 is a front view of a magnetic levitation transport system according to the present invention.
Figure 2:
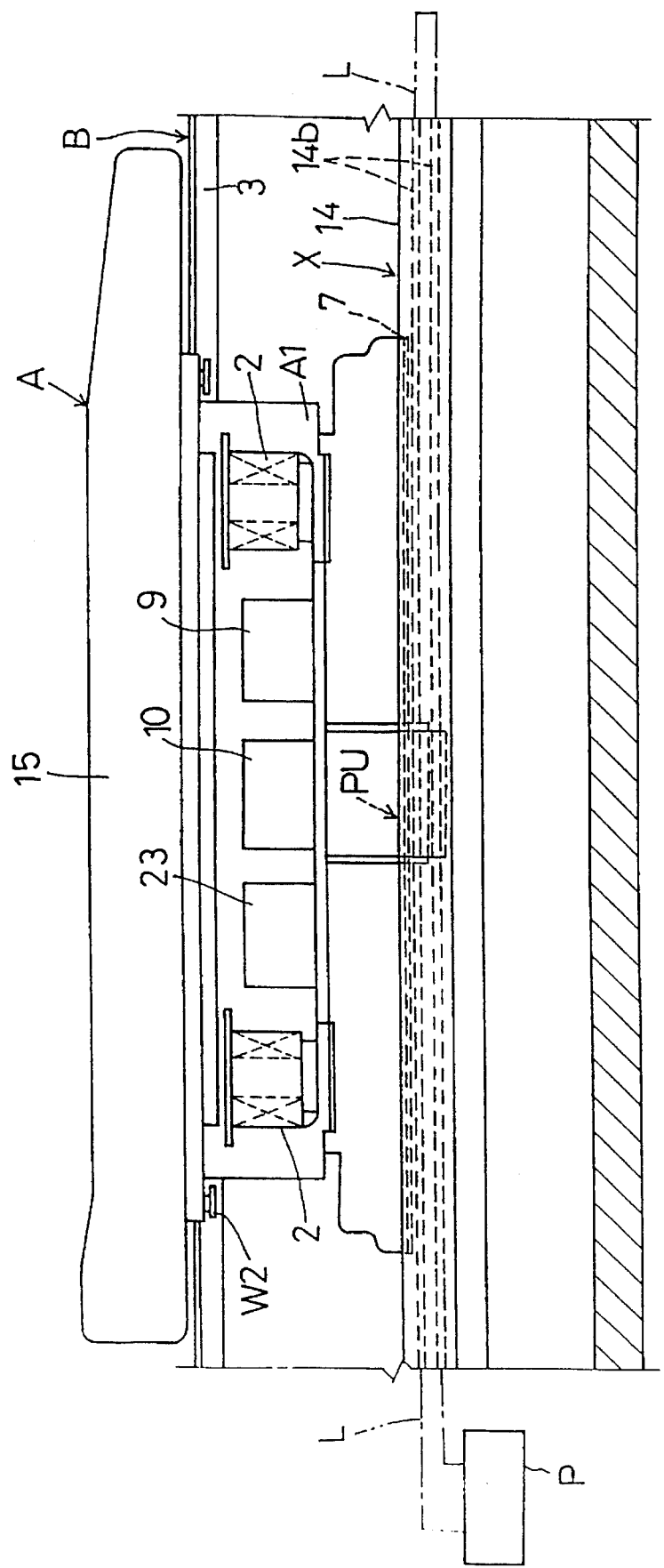
FIG. 2 is a sectional side view of the magnetic levitation transport system.
Figure 3:
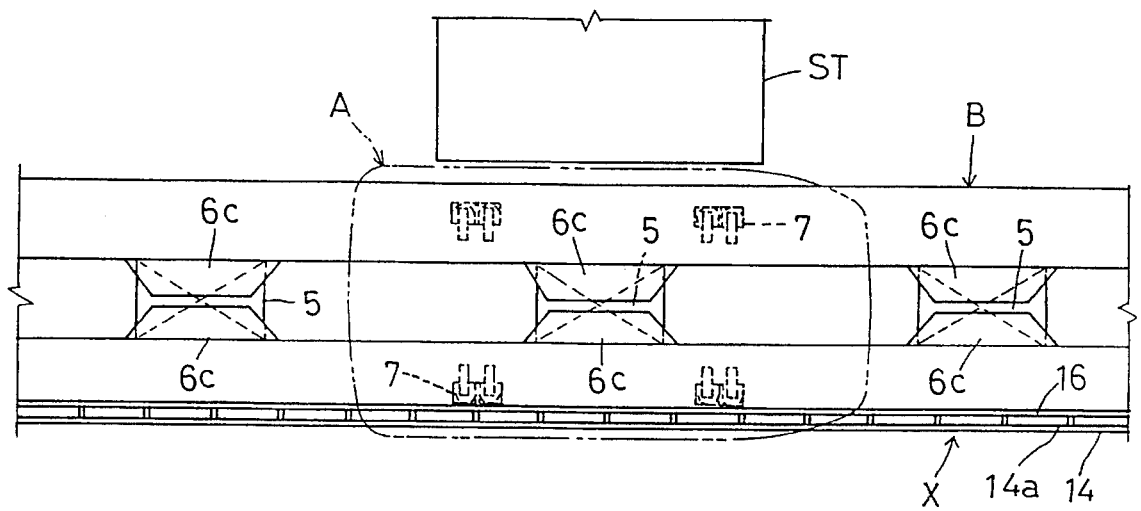
FIG. 3 is a schematic plan view showing a layout of a guide rail in the magnetic levitation transport system.

Referring to FIGS. 1 through 3, a guide rail B has induction line units X extending along inner walls of predetermined blocks thereof. As shown in enlargement in FIG. 4, each induction line unit X includes an elongate plate-like bracket 14 formed of aluminum which is a magnetic field shielding material. The bracket 14 extends along the guide rail B, and supports pairs of upper and lower horizontal hangers 14a arranged at predetermined intervals along the guide rail B. Each hanger 14a supports a plastic duct 14b attached to a distal end thereof and extending along the guide rail B. The duct 14b contains an induction line L connected to a power source assembly P disposed outside the guide rail B as shown in FIG. 2. The induction line L is a strand wire (hereinafter called a litz wire) formed of thin insulated wires, and covered with an insulator such as a plastic material. The above-mentioned predetermined blocks are straight portions of the guide rail B, for example.

Figure 4:
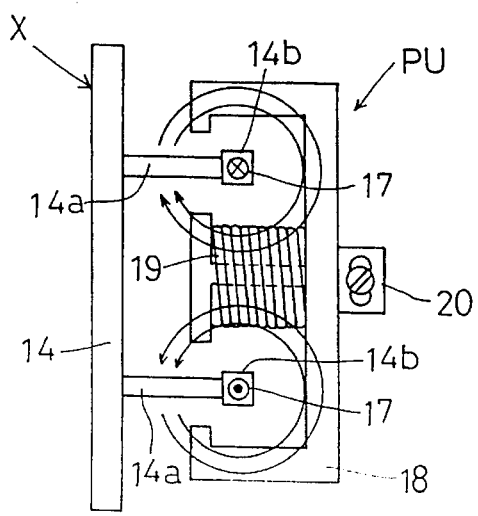
FIG. 4 is a sectional view of a pickup unit in the magnetic levitation transport system.
Figure 5A:
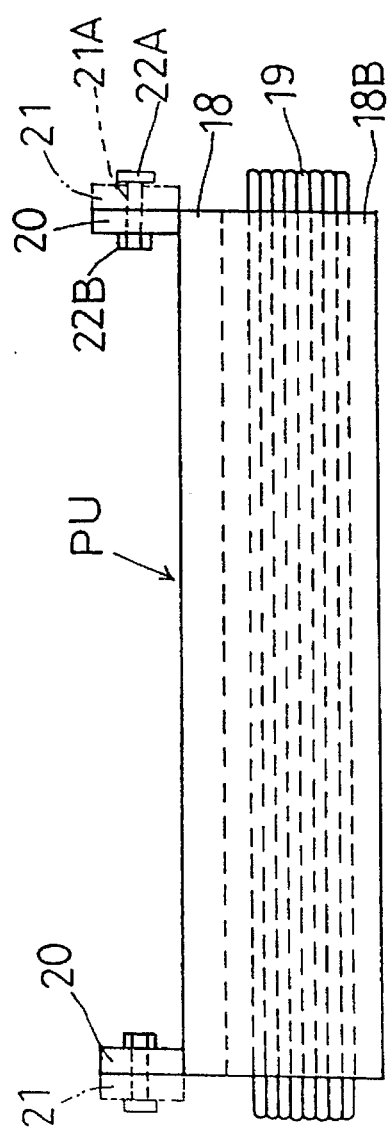
FIGS. 5(a), (b) and (c) are a plan view, a front view and a side view of the pickup unit, respectively.
Figure 5B:
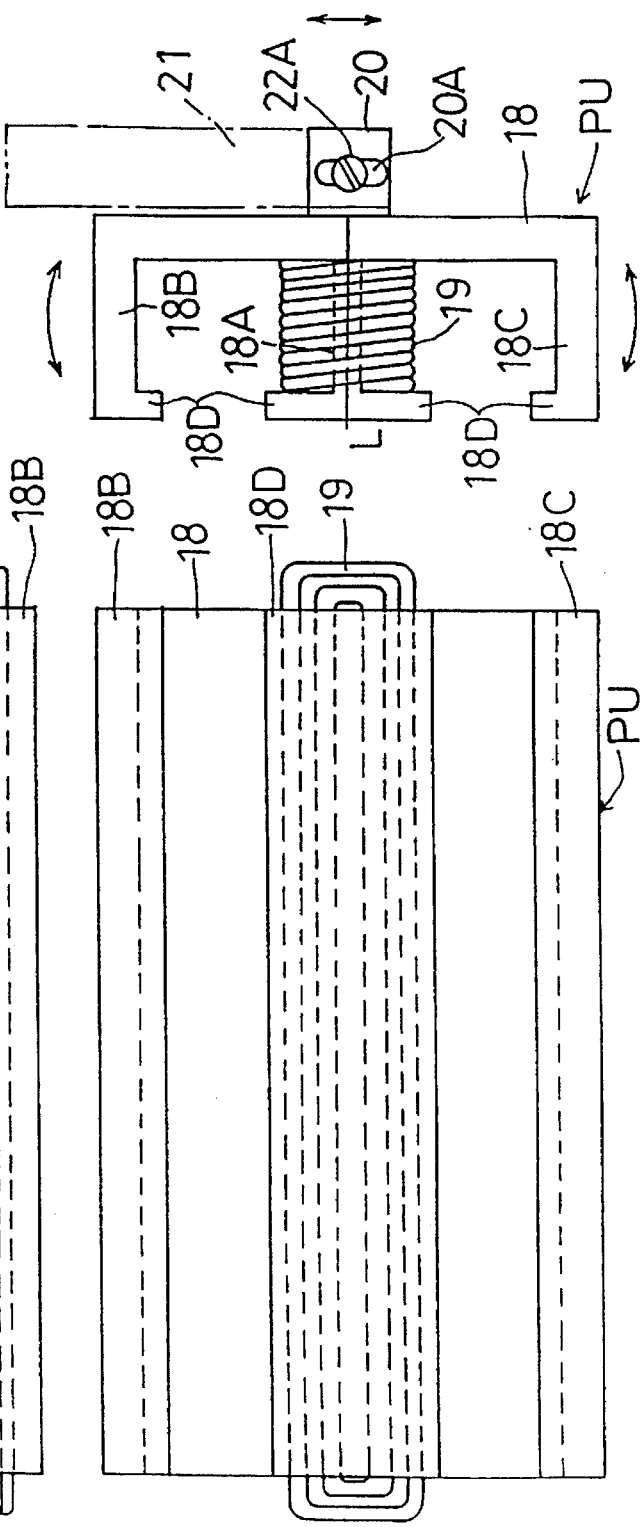
Figure 5C:
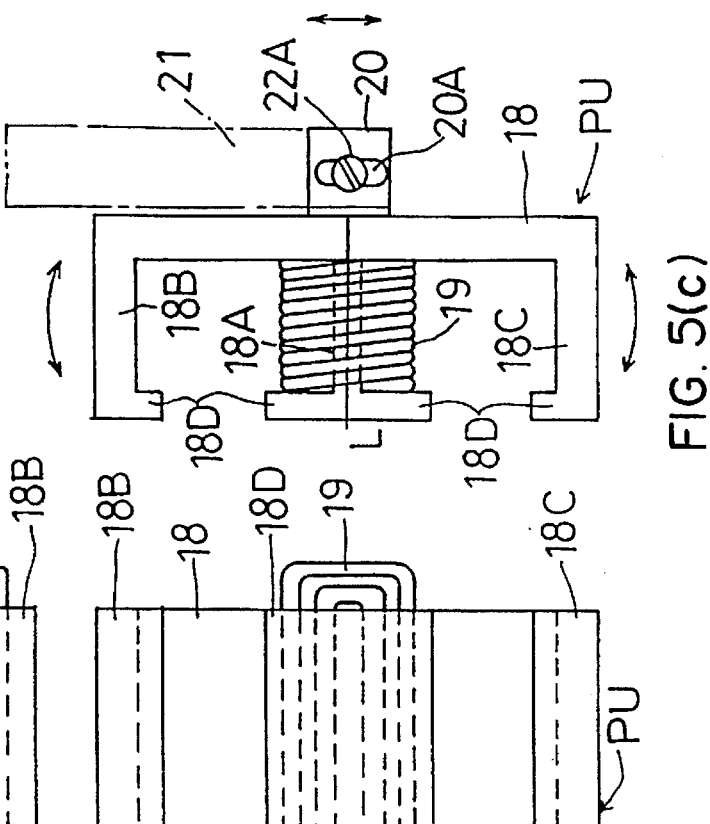

The main body A1 of the vehicle A has a pickup unit PU disposed in a lower position thereof opposed to the bracket 14 supporting the induction line L. As shown in FIG. 5, the pickup unit PU includes a ferrite 18 acting as a magnetic member having an E-shaped section and elongated along the guide rail B, a pickup coil 19 formed of a litz wire wound with 10 to 20 turns around upper and lower surfaces of a middle projection 18A of the ferrite 18, and plate-like lugs 20 attached in vertical posture to opposite ends of one side of the ferrite 18. Projections 18A, 18B and 18C of the ferrite 18 have distal ends 18D extending vertically and inwardly. As shown in FIG. 5 (c), each lug 20 defines a vertically elongated mounting bore 20A having semicircular opposite ends. The lugs 20 are connected to a pair of supports 21 projecting from the vehicle A toward the guide rail B, by bolts 22A extending through mounting bores 20A and 21A. The ferrite 18 of the pickup unit PU is vertically adjusted so that, when the vehicle A is lifted to a predetermined levitation level, the center L of the ferrite 18 be halfway between each pair of ducts 14b of the induction line unit X and perpendicular to the bracket 14. The pickup unit PU is turned as indicated by arrows and vertically adjusted to place the upper and lower projections 18B and 18C of the ferrite 18 above and below the pair of ducts 14b of the induction line unit X, respectively. Then, nuts 22B are tightened to fix the pickup unit PU in position. With the pickup unit PU fixed in position, each duct 14b, as shown in FIG. 4, is disposed substantially halfway between the pickup coil 19 on the ferrite 18 and the upper or lower projection 18B or 18C. The pickup unit PU is constructed such that the ferrite 18 and pickup coil 19 do not contact the ducts 14b or bracket 14 when the vehicle A is not lifted.

Figure 6:
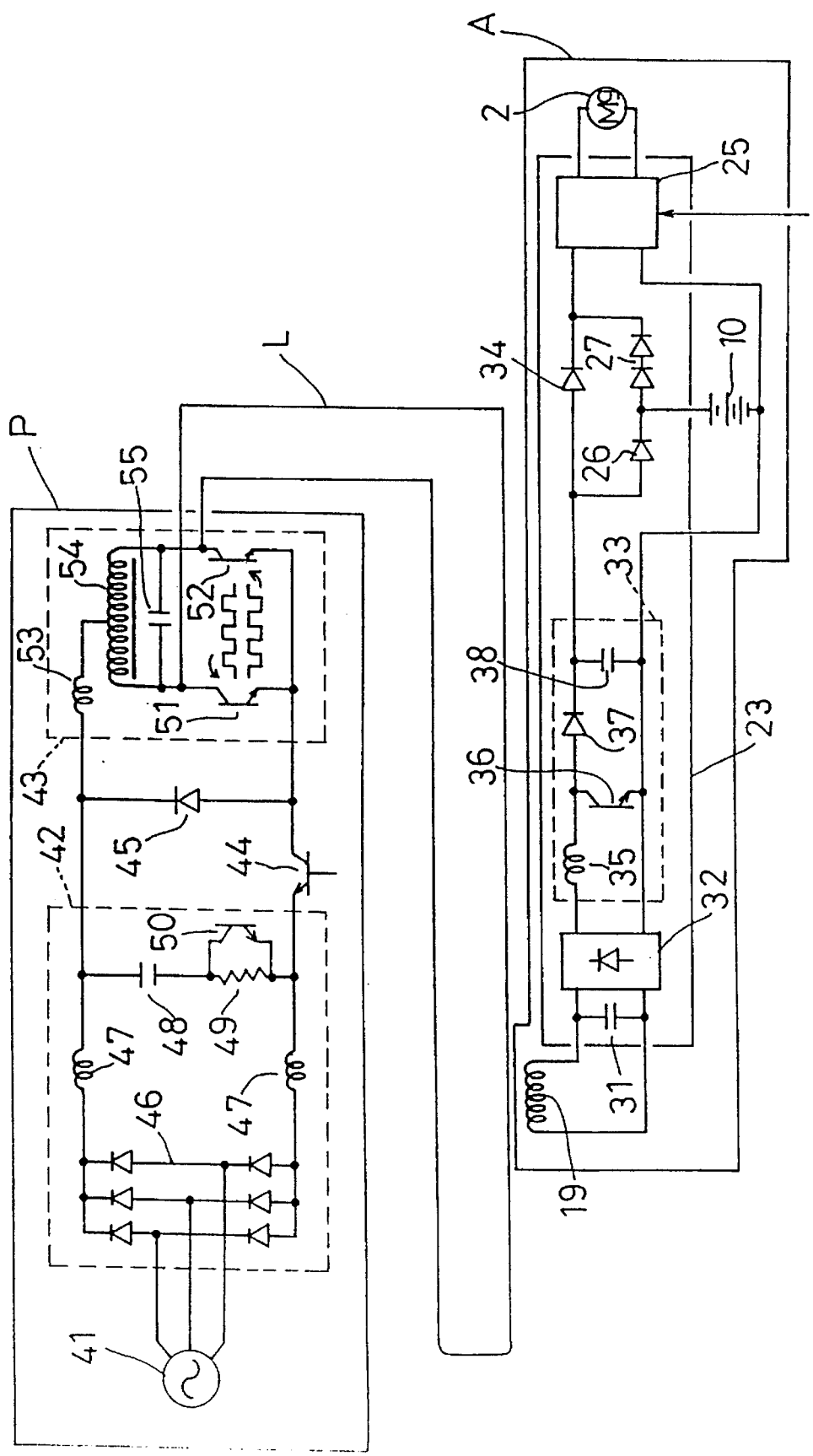
FIG. 6 is a diagram of circuitry in the magnetic levitation transport system.

As shown in FIG. 2, the vehicle A has, mounted on an upper surface of the main body A1, a power receiving unit 23 for receiving an electromotive force generated in the pickup coil 19, a battery 10 for supplying power to electromagnets 2 acting as levitating magnetic force generating means, and a control device 9 for controlling power supplied to the electromagnets 2. The control device 9 confirms a levitation level of the vehicle A based on detection signals received from gap sensors (not shown), produces a signal for controlling electrification of the levitating electromagnets 2, and outputs this signal to a power circuit 25 included in the power receiving unit 23 and connected to the electromagnets 2 as shown in FIG. 6.

Detailed circuit constructions of the power source assembly P and power receiving unit 23 will be described with reference to FIG. 6.

The power source assembly P includes a 200 V three-phase AC source 41, a converter 42, a sine-wave resonance inverter 43, and a transistor 44 and a diode 45 for protection against over-current. The converter 42 includes diodes 46 for full-wave rectification, coils 47 acting as filters, a capacitor 48, a resistor 49, and a transistor 50 for short-circuiting the resistor 49. The sine-wave resonance inverter 43 includes transistors 51 and 52 driven by rectangular wave signals generated alternately as shown in FIG. 6, a current limiting coil 53, a current supplying coil 54 connected to the transistors 51 and 52, and a capacitor 55 forming a parallel resonance circuit with the induction line L. Transistor control devices are omitted from the illustration.

The power receiving unit 23 is connected parallel to the pickup coil 19. The power receiving unit 23 includes a capacitor 31 forming a circuit resonant with a frequency of the pickup coil 19 and induction line L. A rectifying diode 32 is connected parallel to the capacitor 31. A stabilizing source circuit 33 is connected to the diode 32 to control output of the diode 32 to a predetermined DC voltage. The power circuit 25 is connected to the stabilizing source circuit 33 through a diode 34 to adjust electrification of the levitating electromagnets 2. The stabilizing source circuit 33 is connected to the positive electrode of the battery 10 through a diode 26. The positive electrode of the battery 10 is connected also to the power circuit 25 through two diodes 27 forming a high-value priority circuit with the diode 34. The levitating electromagnets 2 are connected to the power circuit 25. The stabilizing source circuit 33 includes a current limiting coil 35, an output adjusting transistor 36, a diode 37 acting as a filter, and a capacitor 38. A transistor control device is omitted from the illustration. The diodes 34, 26 and 27 have the same characteristic.

Operations of the power source assembly P, induction line L and vehicle A will be described next.

The 200 V three-phase alternating current outputted from the AC source 41 is changed to a direct current by the converter 42. This current is changed to a high frequency wave such as a 10 kHz sine wave by the sine-wave resonance inverter 43 and suppled to the induction line L. The control device 9 confirms a levitation level of the vehicle A based on detection signals received from the gap sensors, and outputs an electrification control signal to the power circuit 25 in the power receiving unit 23 to place the vehicle A at a predetermined levitation level.

In the straight portions of the guide rail B where the induction line L is laid, a magnetic flux generated in the induction line L generates an electromotive force in the pickup coil 19 of the vehicle A resonant with the frequency of the induction line L. An alternating current generated by this electromotive force is rectified by the diode 32 in the power receiving unit 23, controlled to a predetermined DC voltage by the stabilizing source circuit 33, and supplied to the levitating electromagnets 2 through the power circuit 25 according to the electrification control signal inputted thereto from the control device 9, thereby lifting the vehicle A. The stabilizing source circuit 33 acts also to charge the battery 10. In the straight portion of the guide rail B, the high-value priority circuit formed of the diodes 34 and 27 is operable to pass no current from the battery 10 to the power circuit 25. In this state, the vehicle A is propelled by the primary coils 5 provided at stations ST.

In curved portions of the guide rail B having no induction line L, no electromotive force is generated in the pickup coil 19 of the vehicle A, and zero voltage is outputted from the stabilizing source circuit 33. In the curved portions, power is supplied from the battery 10 to the power circuit 25 and, according to the electrification control signal inputted from the control device 9, the power circuit 25 electrifies the levitating electromagnets 2 to lift the vehicle A.

As described above, the vehicle A receives power in a non-contact mode, with the battery 10 being charged as well, while transporting a load along the guide rail B. It is unnecessary to change the battery every five or six hours, which assures improved operating efficiency. Maintenance of the battery need not be carried out for one year or more, thereby drastically reducing maintenance time. Power may be supplied to the vehicle A regardless of its moving direction.

Since power is supplied in a non-contact mode, this system does not produce dust as produced through contact between a power supply rail and a collector in the prior art. Thus, the transport system according to the present invention may be used in a cleanroom.

As noted hereinbefore, the E-shaped ferrite 18 is fixed with the opening side thereof opposed to one side of the bracket 14, and with the pickup coil 19 placed halfway between two tiers of the induction line L. Consequently, as shown in FIG. 4, the pickup coil 19 lies in a position of maximum flux density produced by the induction line L, whereby a maximum electromotive force is induced for efficient power supply.

Since the induction line units X are provided only in straight portions of the guide rail B, the pickup unit PU is free from contact with the induction lines L. The pickup unit PU could contact the induction lines L if the latter were provided in curved portions also. Thus, the ferrite 18 of the pickup unit PU may have a freely selected length. However, an induction line unit X may be provided in each gently curved portion to extend continuously along the guide rail B.

Figure 7:
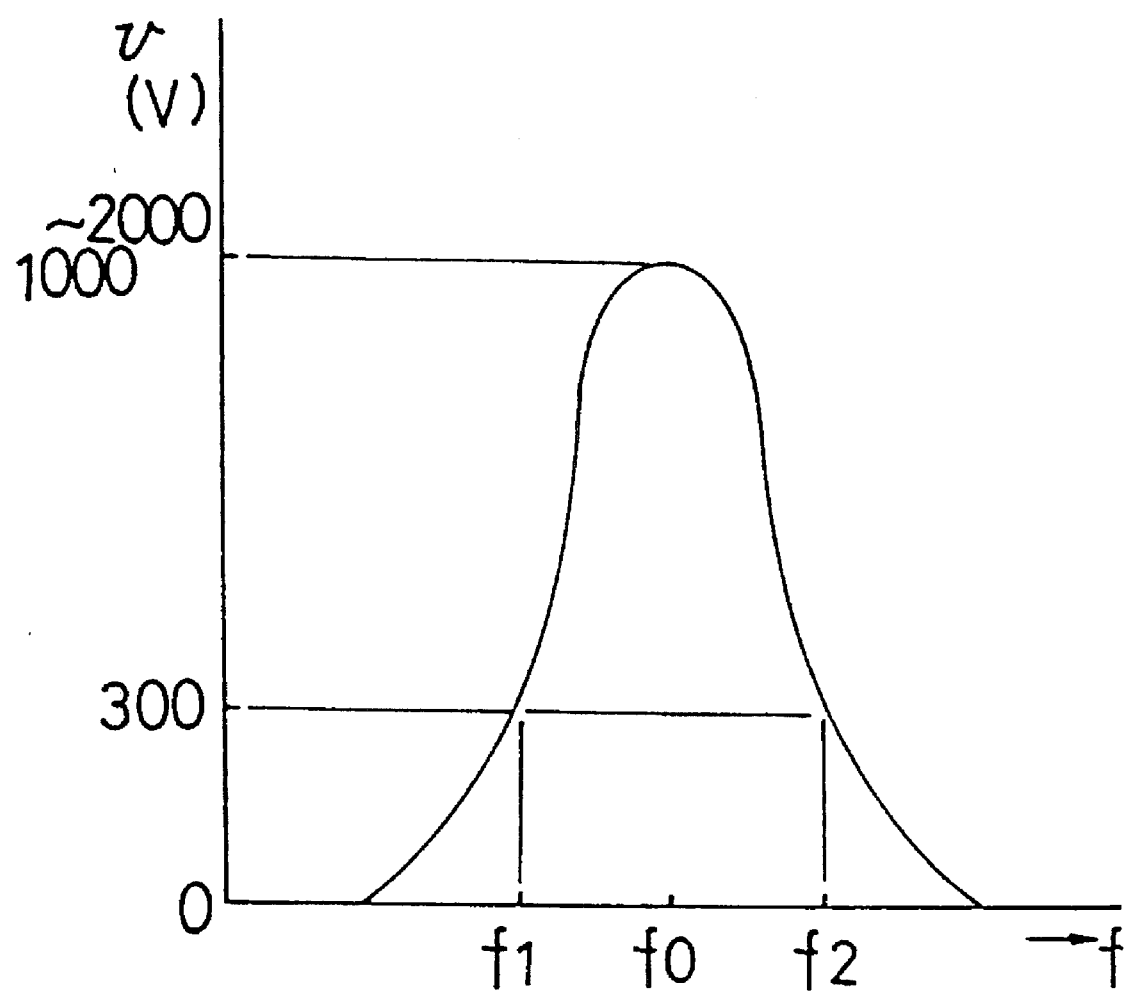
FIG. 7 is a graph of secondary frequency to electromotive force characteristics of the magnetic levitation transport system.

Since the induction line L is longer than the pickup coil 19, the induction line L has a substantially constant primary inductance. Further, since the capacitor 55 of the power source assembly P and induction line L form a resonance circuit, the induction line L may receive a high frequency, sine-wave primary current in a substantially constant, large amount. With the pickup coil 19 forming a secondary resonance circuit, as shown in FIG. 7, a high secondary voltage (1000 to 2000 V in the graph) is generated at resonance frequency f0. A secondary voltage exceeding a predetermined value (300 V in the graph) may be generated in a frequency range f1–f2 even if levitation of the vehicle A vertically displaces the pickup coil 19 with respect to the induction line L, even if the frequency of the induction line L varies a little, and even if the secondary resonance frequency varies a little from the frequency of the induction line L. This assures a steady supply of a large amount of power. The vertical adjustment noted hereinbefore may be carried out roughly in order to promote operating efficiency and facilitate manufacture.

The litz wires covered with an insulating material are used as the induction line L and pickup coil 19, which present no exposure of the conductive parts, thereby promoting safety. The absence of sparks eliminates risks of fire. Thus, this transport system may be used in an explosion-proof area. Since the induction line L receives a sine wave, no higher harmonics are generated and hence no radio noise.

In the foregoing embodiment, one duct 14b contains one induction line L. Instead, one duct 14b may contain two or more induction lines L to boost power. An inverter may be connected to the stabilizing source circuit 33 in the power receiving unit 23 to collect a commercial frequency alternating current. This current may be used to drive a loading and unloading motor mounted on the load supporting deck 15 of the vehicle A.

Another embodiment will be described hereinafter.

Figure 9:
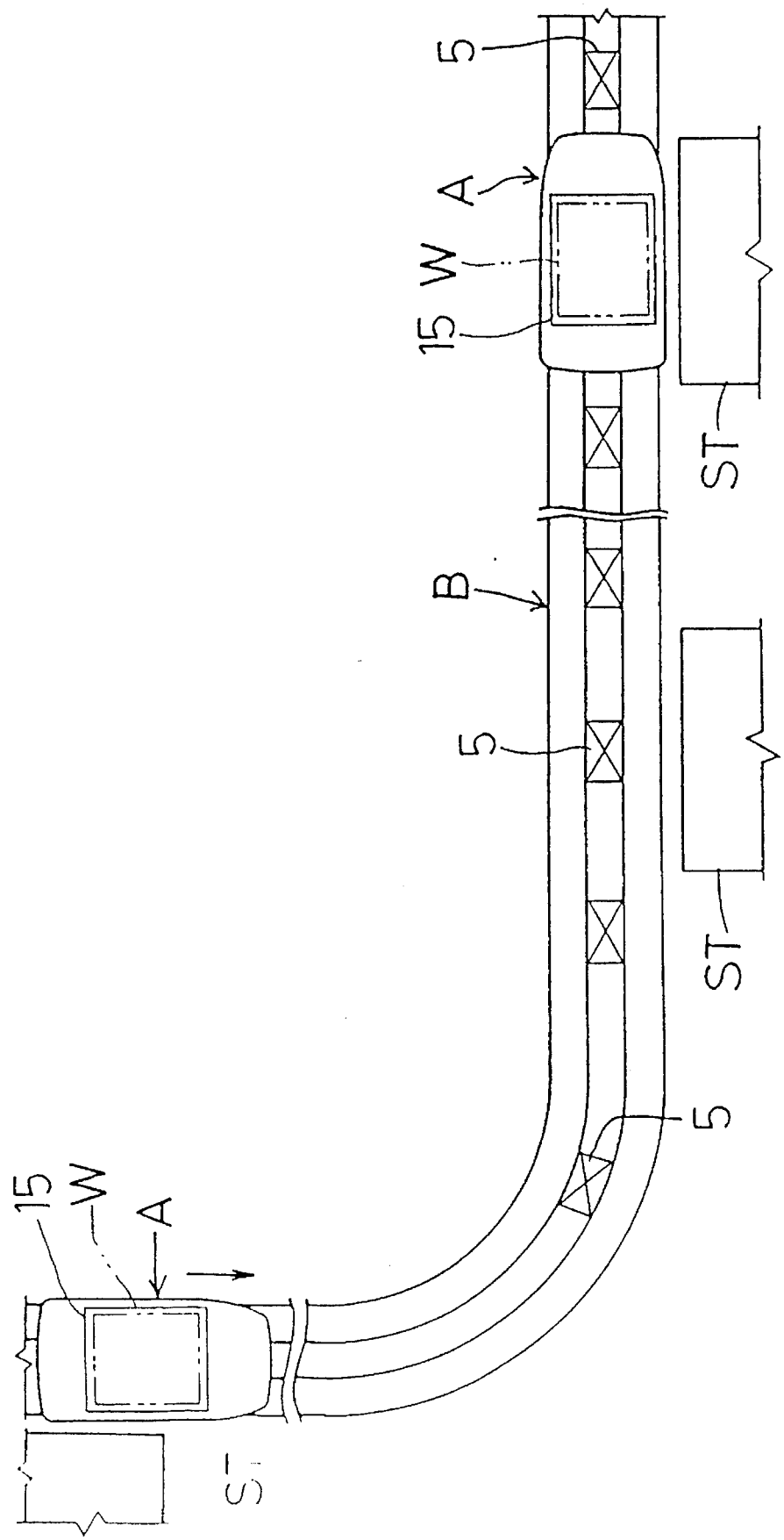
FIG. 9 is a layout plan view showing a portion of the magnetic levitation transport system of FIG. 8.

An unmanned transport system in this embodiment is operable automatically to transport loads such as semiconductor wafers in a cleanroom. As shown in FIG. 9, the transport system includes a guide rail B extending along a running track of vehicles A. Each vehicle A is magnetically levitated, and driven by a linear motor to run along the guide rail B.

Figure 10:
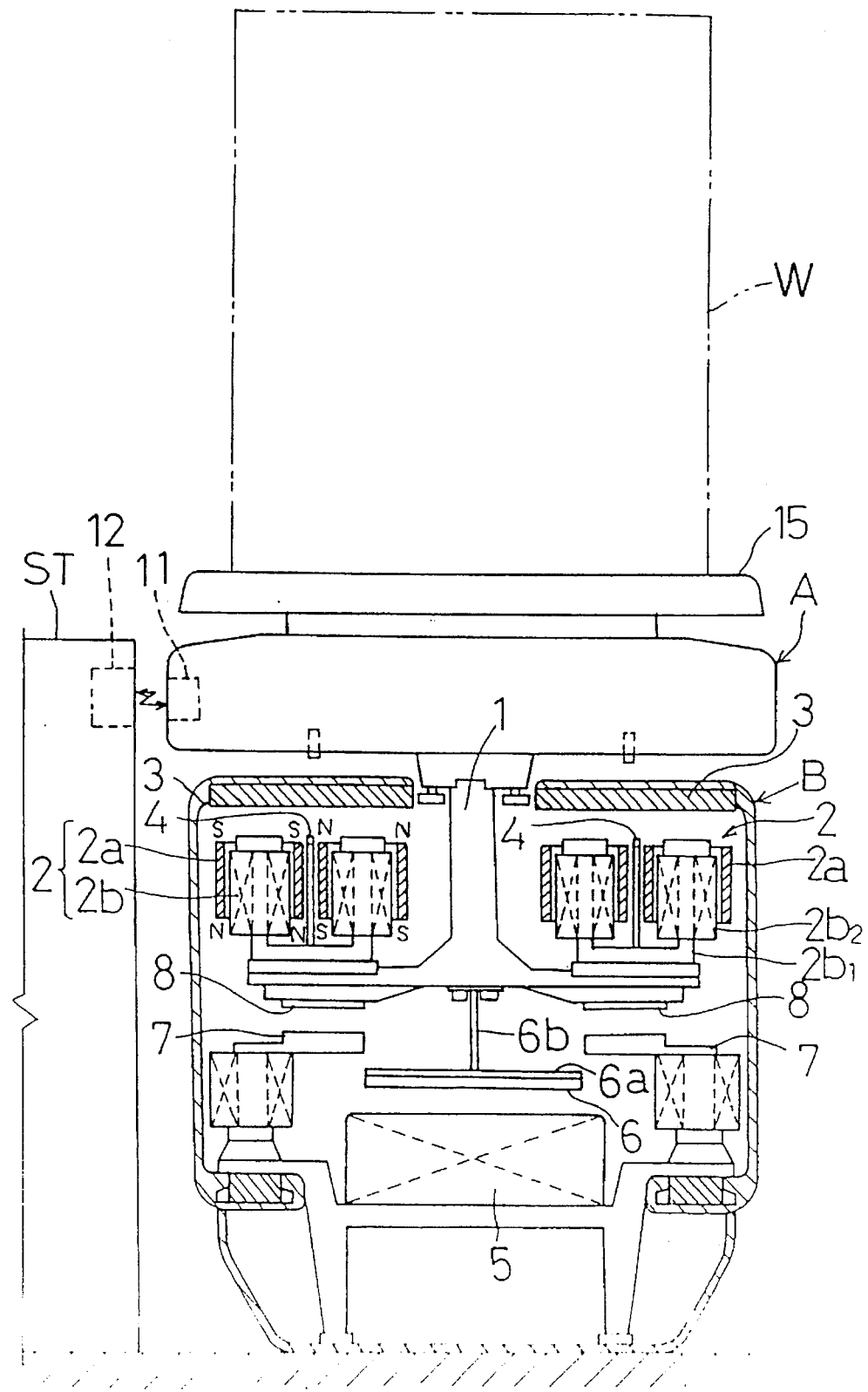
FIG. 10 is a sectional view of the vehicle and guide rail as seen in a direction of movement of the vehicle.
Figure 11:
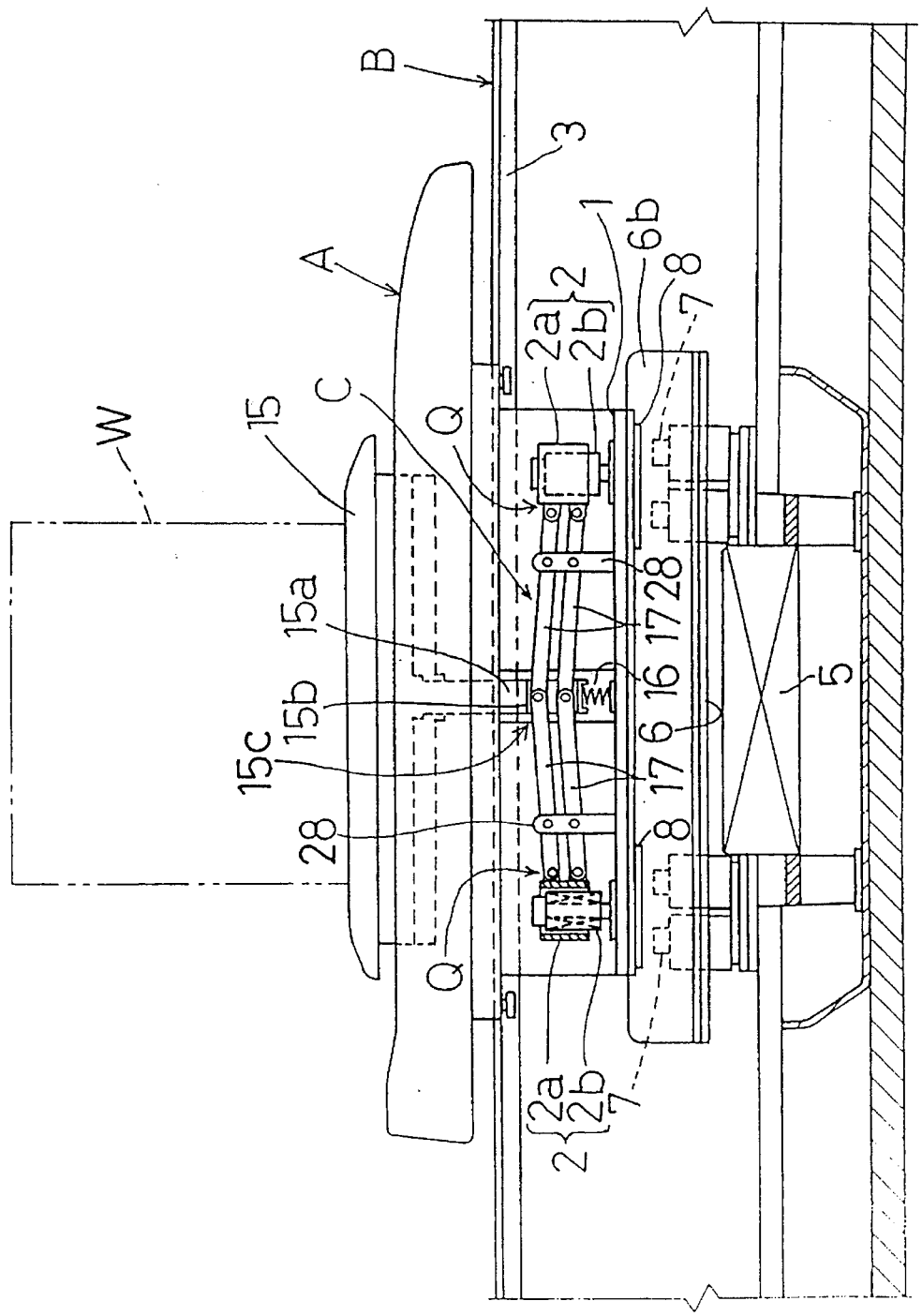
FIG. 11 is a side view showing construction of the vehicle and guide rail of FIG. 10.

As shown in FIGS. 10 and 11, the guide rail B has levitating magnetic members 3 attached to lower surfaces of upper horizontal flanges thereof to be attracted by magnetic force generating devices 2 of each vehicle A. The magnetic force generating devices 2 are mounted on a lower frame 1 of the vehicle A and distributed to four, front and rear and right and left, corners of the vehicle A. Each magnetic force generating device 2 includes permanent magnets 2a and electromagnets 2b, and is opposed to one of the levitating magnetic members 3.

The electromagnets 2b share a U-shaped yoke 2b1 having a pair of end faces opposed to one of the levitating magnetic members 3, and two coils 2b2, connected in series and wound around two bobbins mounted on the yoke 2b1. The permanent magnets 2a are formed cylindrical to surround the coils 2b2, respectively. Thus, as shown in plan in FIG. 8, each end face of the yoke 2b1, coil 2b2 and permanent magnet 2a are arranged concentrically. Each pair of permanent magnets 2a is rigidly attached to a frame 2a1, and movable vertically (perpendicular to the sheet of FIG. 11) by a mounting structure described hereinafter.

One of the permanent magnets 2a forming a pair has an end face opposed to the levitating magnetic member 3 (i.e. upper end) providing N-pole, and a lower end providing S-pole, while the other permanent magnet 2a forming the pair has an upper end providing S-pole and a lower end providing N-pole. Each permanent magnet 2a produces a magnetic force (attractive force) with the levitating magnetic member 3. A magnetic flux produced by the electromagnets 2b passes through a magnetic circuit including the yoke 2b1, levitating magnetic member 3, and a pair of gaps formed between the two end faces of the yoke 2b1 and magnetic member 3, to generate a magnetic force between the electromagnets 2b and magnetic member 3.

The magnetic force of the permanent magnets 2a and that of the electromagnets 2b have a mutually boosting effect where the permanent magnets 2a and electromagnets 2b produce magnetic fluxes in the same direction (i.e. have the same polarity), but attenuate each other where the magnetic fluxes are produced in opposite directions. Thus, the attractive force acting between the magnetic force generating devices 2 and levitating magnetic members 3 may be varied with respect to the magnetic force of the permanent magnets 2a by reversing polarity of an exciting current supplied to the electromagnets 2b (coils 2b2) or varying intensity thereof.

Each vehicle A includes a control device for controlling the exciting currents supplied to the electromagnets 2b to control the magnetic force of magnetic force generating devices 2, thereby to control levitation of the vehicle A above the guide rail B. The control by the control device of the exciting currents supplied to the electromagnets 2b will be described later.

The guide rail B includes primary coils 5 mounted in the bottom thereof, while each vehicle A includes a secondary conductor 6 supported by the lower frame 1 through a prop 6b. The primary coils 5 and secondary conductor 6 constitute a linear motor for driving the vehicle A. The secondary conductor 6 has a magnetic plate 6a applied thereto. The primary coils 5 produce magnetic fields to act on the secondary conductor 6 and propel the vehicle A.

The primary coils 5 are arranged at predetermined intervals along the guide rail B to save installation cost, and the vehicle A runs by inertia from one primary coil 5 to another. However, the primary coils 5 are, of necessity, arranged at and adjacent each station ST to decelerate the vehicle A to a standstill and to start and accelerate the vehicle A.

The guide rail B includes stopping electromagnets 7 arranged in positions opposed to each station ST to maintain the vehicle A at a standstill as magnetically levitated. The vehicle A includes stopping magnetic members 8 attached to the lower frame 1 to be attracted by the electromagnets 7. The magnetic members 8 are arranged in the front and rear and right and left corners of the vehicle A. Four electromagnets 7 are arranged in place opposite the station ST to act on the respective magnetic members 8.

Thus, the vehicle A is driven, under ground control, by the ground, primary type linear motor formed of the primary coils 5 and secondary conductor 6, and is stopped at each station ST and maintained still also under ground control. The controls of the primary coils 5 include deceleration, stoppage, starting and acceleration at and adjacent each station ST, and intermediate acceleration and deceleration between the stations ST. A ground controller effects these controls by varying direction and frequency of magnetic fields produced from the primary coils 5.

Figure 12:
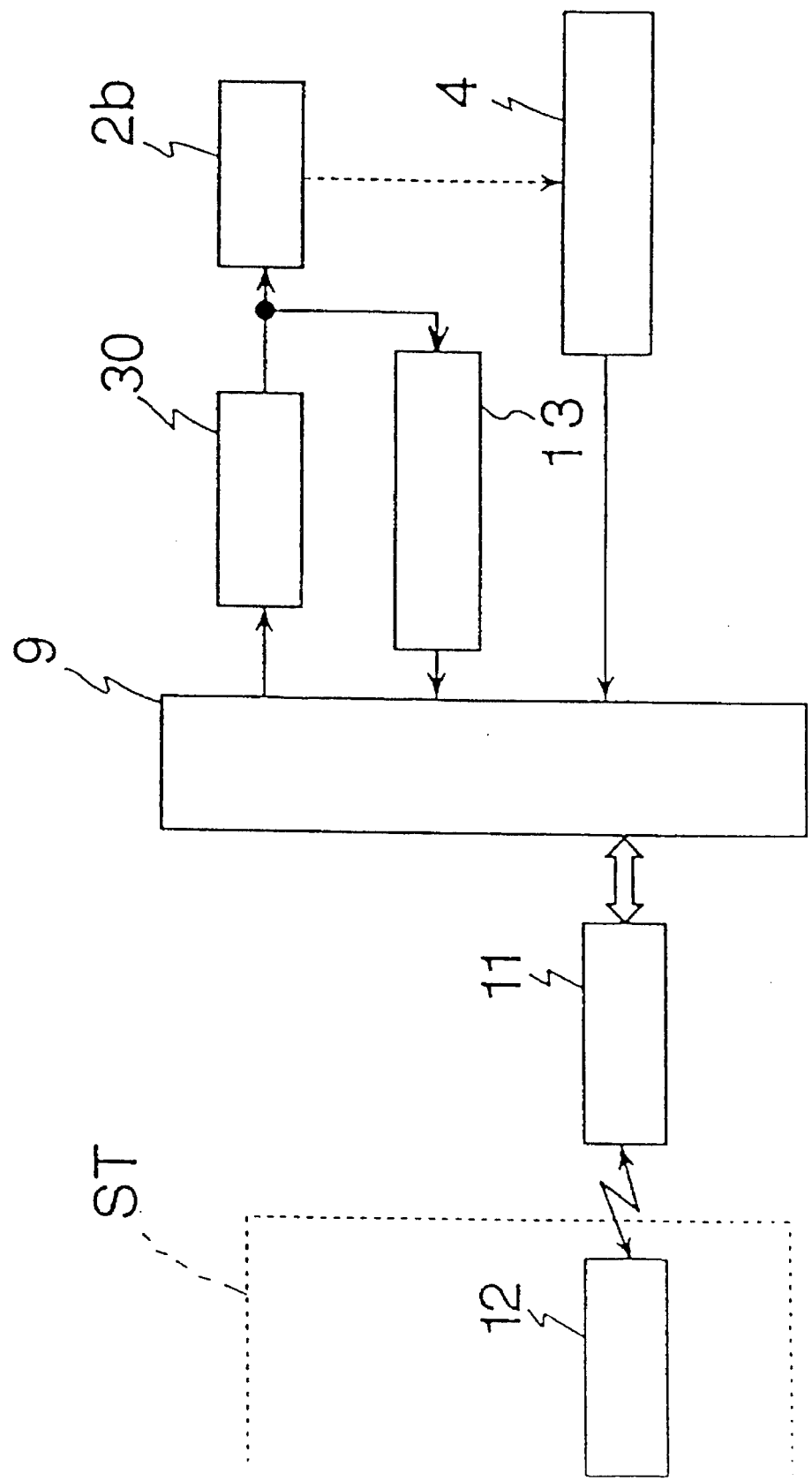
FIG. 12 is a block diagram showing controls effected by a control device of the vehicle shown in FIG. 8.

The vehicle A has a control device 9 mounted thereon. As shown in FIG. 12, the control device 9 has main functions to control, through a drive circuit 30, the exciting current supplied to the electromagnets 2b, and to exchange information with each station ST through communication units 11 and 12 by means of optical communication. The information exchanged includes information regarding the identification number and load conditions of the vehicle A, information regarding charging and discharging of a battery, and information regarding running and stoppage of the vehicle A.

Though not shown in FIG. 12, a total of four drive circuits 30 are provided to drive the four magnetic force generating devices 2 (electromagnets 2b) arranged in the front and rear and right and left corners of the vehicle A, respectively. The control device 9 transmits information regarding polarity and amount of the exciting current supplied to each of the four drive circuits 30. Output of each drive circuit 30 (i.e. the exciting current) is fed back to the control device 9 through a current detector (or current detecting circuit) 13. The control device 9 also receives detection information from four gap sensors 4 each disposed centrally of the magnetic force generating device 2 (see FIG. 10).

Based on the detection information received from the gap sensors 4, the control device 9 controls the exciting currents supplied to the electromagnets 2b to secure a proper gap between the vehicle A and guide rail B. The control device 9 also varies the proper gap according to the weight of a load, and controls the exciting currents to zero steady level based on detection information received from the current detectors 13. That is, the control device 9 controls the exciting currents supplied to the electromagnets 2b within a small range centering on zero. Consequently, the magnetic forces of the electromagnets 2b are used to increase and decrease the magnetic forces of the magnetic force generating devices 2 with respect to the magnetic forces of the permanent magnets 2a. In this way, the attractive forces acting between the magnetic force generating devices 2 and levitating magnetic members 3 balance the gravity of the vehicle A including the load.

With the above control, the heavier the load is, the smaller is the gap between the vehicle A and guide rail B. Naturally, there is a physical limitation to the range of adjustment of the gap between the vehicle A and guide rail B. This magnetic levitation transport system includes an adjusting device for adjusting relative positions between the permanent magnets 2a and electromagnets 2b in the directions toward and away from the levitating magnetic members 3. With the position of the electromagnets 2b regarded as a reference position, the heavier the load is, the closer the permanent magnets 2a are moved to the levitating magnetic members 3. This increases the attractive force acting between the permanent magnets 2a and levitating magnetic members 3. A specific construction of this adjusting device C will be described with reference to FIG. 8.

Figure 8:
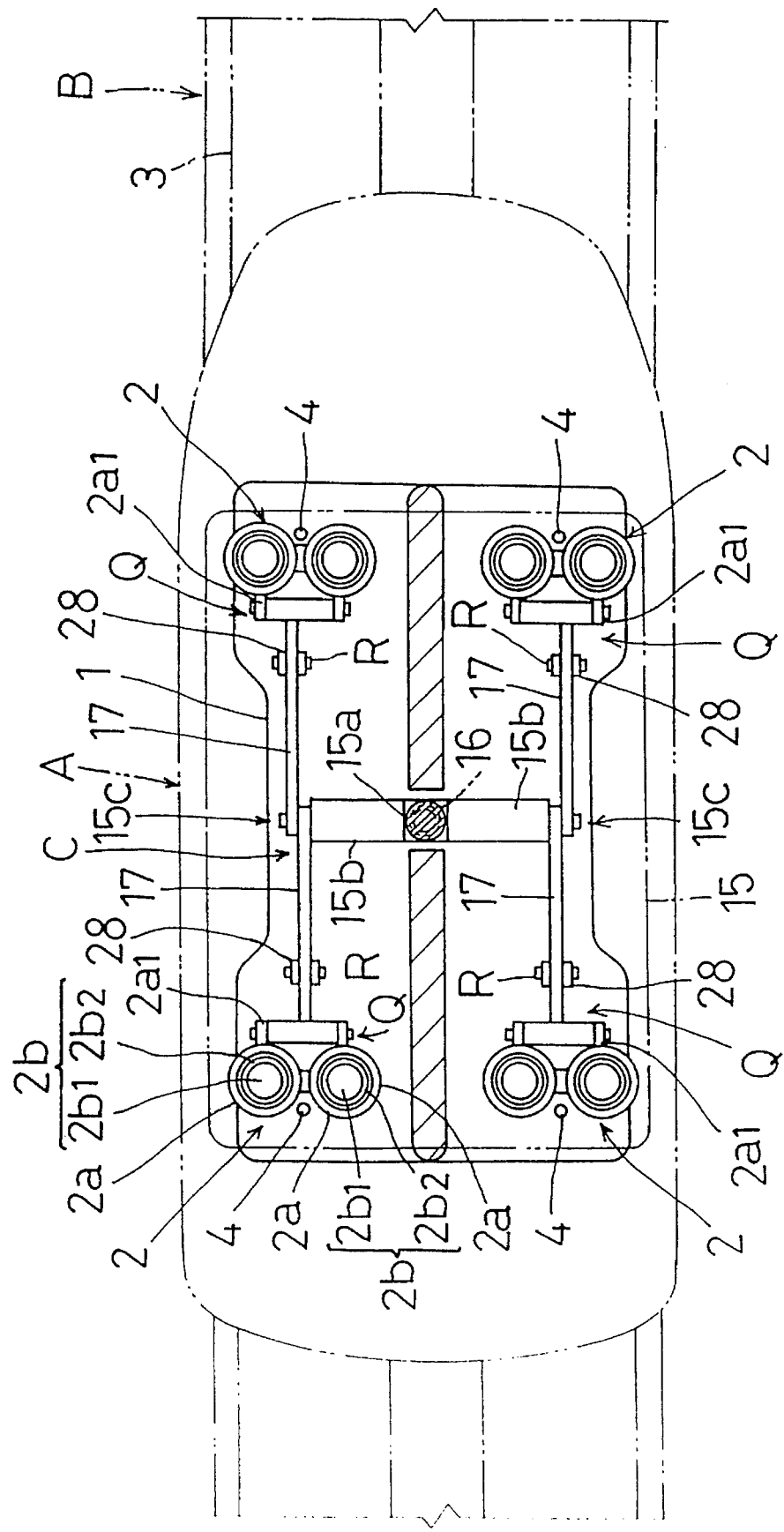
FIG. 8 is a plan view of a vehicle having a magnetic force generating device in another embodiment of the invention.

As shown in FIG. 8, a load supporting deck 15 for supporting a load W is attached to the lower frame 1 through a spring 16. The load supporting deck 15 is movable downward, compressing the spring 16, under the weight of the load W. That is, the weights of the load W and load supporting deck 15 balance a restoring force of the spring 16. The frames 2a1 of the permanent magnets 2a are attached to a lower end of the load supporting deck 15 through parallel links 17. With vertical movement of the load supporting deck 15, the permanent magnets 2a are vertically movable by leverage.

As shown in FIGS. 8–11, a lower end region of the load supporting deck 15 has an inverted T-shaped configuration including a vertical rod portion 15a vertically movably supported by the lower frame 1, and horizontal rod portions 15b extending right and left from a lower end of the vertical rod portion 15a. The parallel links 17 extending in the fore and aft direction are pivotally connected to opposite distal ends 15c of the horizontal rod portions 15b, respectively. The frames 2a1 of the permanent magnets 2a are pivotally connected to distal ends Q of the parallel links 17. The parallel links 17 are pivotally supported in intermediate positions thereof by support elements 28.

When the load supporting deck 15 moves vertically downward, lowering the opposite ends 15c of the horizontal rod portions 15b, each parallel link 17 acts as a lever having a pivotal connection R to the support element 28 acting as a fulcrum, the end 15c acting as a force applying point, and the distal end Q acting as an output point, to raise the permanent magnets 2a pivotally connected to the distal end Q.

The above construction provides the adjusting device C. The heavier the load is, the closer the permanent magnets 2a are moved to the levitating magnetic members 3. The spring 16 may have an appropriately selected coefficient to realize a proper relationship between load weight and amount of movement.

This embodiment may be modified as follows:

(1) The specific construction of each magnetic force generating device 2 including the permanent magnets 2a and electromagnets 2b may be varied in many ways as set out hereunder. What is important is that the permanent magnets 2a and (the yoke 2b1 of) electromagnets 2b are arranged opposite the levitating magnetic members 3. It is of course possible to work the invention without moving the electromagnets 2b toward and away from the levitating magnetic members 3.

Figure 13A:
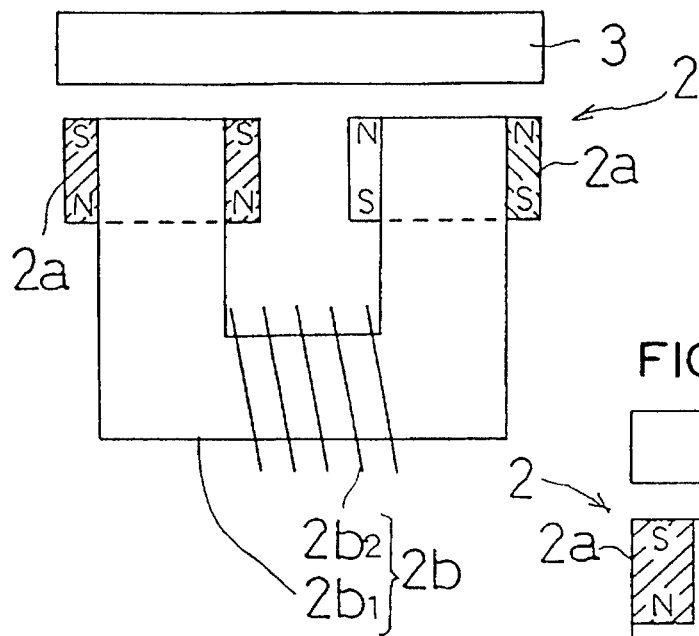
FIGS. 13(a), (b), (c) and (d) are schematic views of modified magnetic force generating devices, respectively.

FIG. 13(a) shows a magnetic force generating device 2 including a coil 2b2 of an electromagnet 2b mounted centrally of a yoke 2b1, and a pair of cylindrical permanent magnets 2a fixedly mounted on the yoke 2b1. This magnetic force generating device 2 has a diminished overall construction.

Figure 13B:
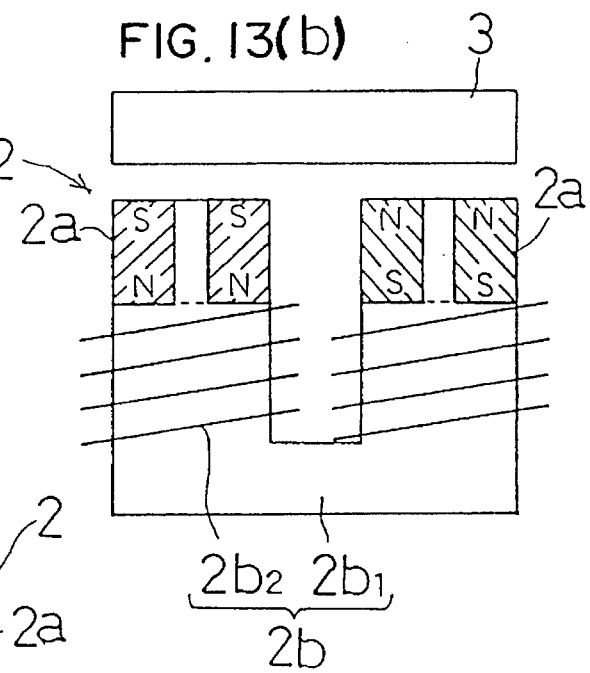

FIG. 13(b) shows a magnetic force generating device 2 including coils 2b2 of electromagnets 2b mounted on a yoke 2b1 as in the foregoing embodiment. The yoke 2b1 has opposite ends thereof cut thin, and a pair of cylindrical permanent magnets 2a are fixedly mounted on the thin opposite ends of the yoke 2b1. With this construction, in a section of the magnetic circuit of the electromagnets 2b, pan of the magnetic flux passes through the yoke 2b1, and part of the flux passes through the permanent magnets 2a. In this case, the electromagnets 2b have a lower efficiency than in the foregoing embodiment and in the modification shown in FIG. 13(a), but have a higher efficiency than where intermediate portions or opposite ends of the yoke 1b1 am totally replaced with permanent magnets 2a.

Figure 13C:
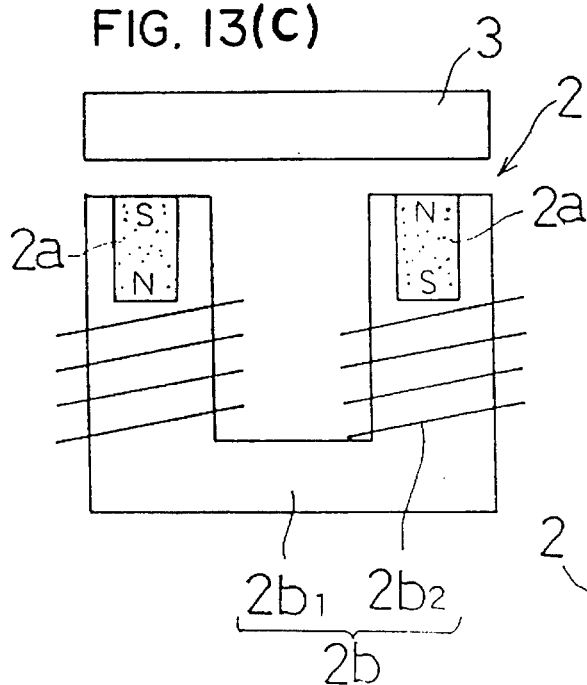
Figure 13D:
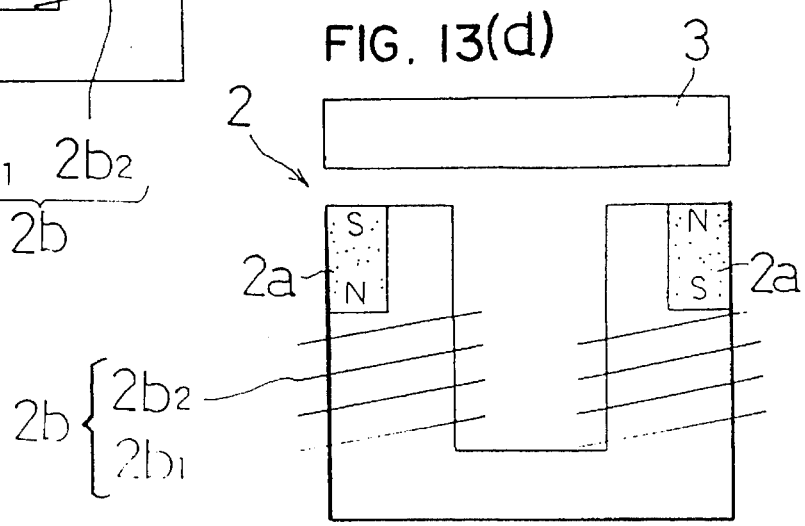

This applies also to the modifications shown in FIGS. 13(c) and (d). In FIG. 13(c), a yoke 2b1 has opposite ends defining cylindrical recesses centrally thereof in which cylindrical permanent magnets 2a are securely fitted, respectively. In FIG. 13(d), a yoke 2b1 has opposite ends defining semicylindrical cutouts in which semicylindrical permanent magnets 2a are securely fitted, respectively. In each of the modifications shown in FIGS. 13(b) through (d), the permanent magnets 2a are rigidly attached to the yoke 2b1 without presenting projections. This facilitates positioning of the coils 2b2, and allows the magnetic force generating device 2 to have a compact construction compared with the foregoing embodiment.

(2) In the described magnetic levitation transport system, the gap between the vehicle and guide rail is varied to bring the exciting currents for the electromagnets to zero steady level. However, the present invention is applicable to a transport system which does not employ such a system but simply controls the exciting currents for the electromagnets, based on the detection information from the gap sensors 4, so that the gap between the vehicle and guide rail becomes a predetermined value.

In this case, the heavier the load is, to the greater degree the exciting currents for the electromagnets are increased to increase the attractive force acting between the magnetic force generating devices and levitating magnetic members. The attractive force acting between the magnetic force generating devices and levitating magnetic members may be varied by moving the permanent magnets toward or away from the magnetic members, so that variations in the exciting currents for the electromagnets compensate for variations in the attractive force. That is, the variations in the exciting currents for the electromagnets may be limited to a small range.

(3) The construction for moving the permanent magnets closer to the levitating magnetic members with the heavier load is not limited to the construction in the foregoing embodiment but may be varied in many ways. The vehicle may include a sensor for detecting the weight of a load, and actuators for moving the permanent magnets. Then, the control device may be adapted to operate the actuators in response to detection information received from the sensor.

(4) In converse to the foregoing embodiment, the electromagnets may be adapted vertically movable with the permanent magnets fixed to the vehicle. What is important is that the permanent magnets and electromagnets are movable relative to each other toward and away from the levitating magnetic members.

(5) It is not absolutely necessary to vary relative positions between the permanent magnets and electromagnets automatically in response to detection of a load weight. In the foregoing embodiment, for example, the control device 9 may refer to the load information transmitted from station ST to vehicle A through the communication units 11 and 12 to determine an amount of operation of actuators and operate the actuators to move the permanent magnets.

Alternatively, manually operable devices may be provided to adjust relative positions between the permanent magnets and electromagnets, to effect manual adjustment at a time of installation or maintenance.

A further embodiment will be described hereinafter.

An unmanned transport system in this embodiment is operable automatically to transport loads such as semiconductor wafers in a cleanroom. As shown in FIG. 9, the transport system includes a guide rail B extending along a running track of vehicles A. Each vehicle A is magnetically levitated and driven by a linear motor to run along the guide rail B as described hereinafter. A plurality of stations ST are arranged along the guide rail B, where the vehicles A may stop for loading and unloading operations.

Figure 14:
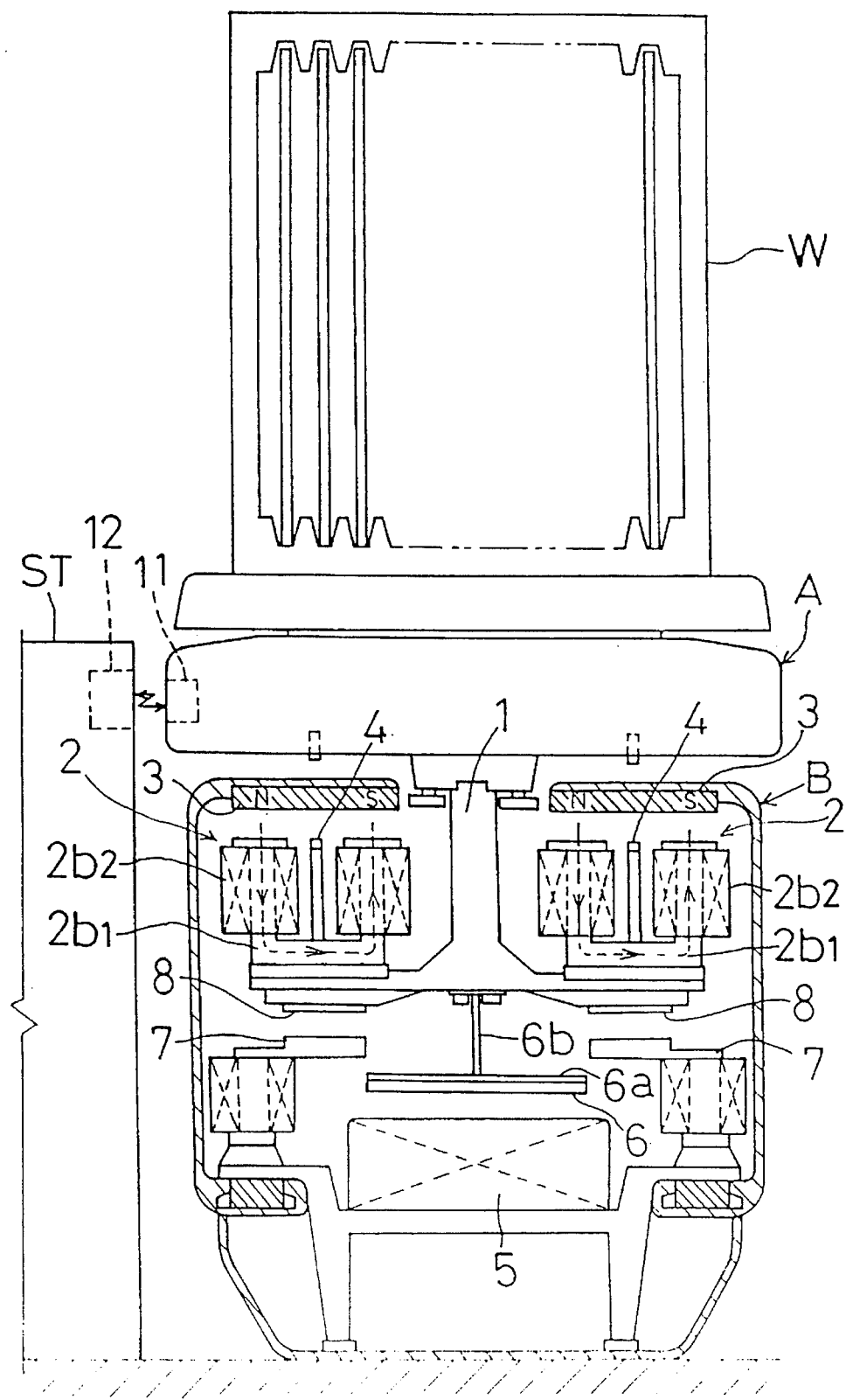
FIG. 14 is a sectional view of a vehicle and a guide rail in a further embodiment of the invention.
Figure 15:
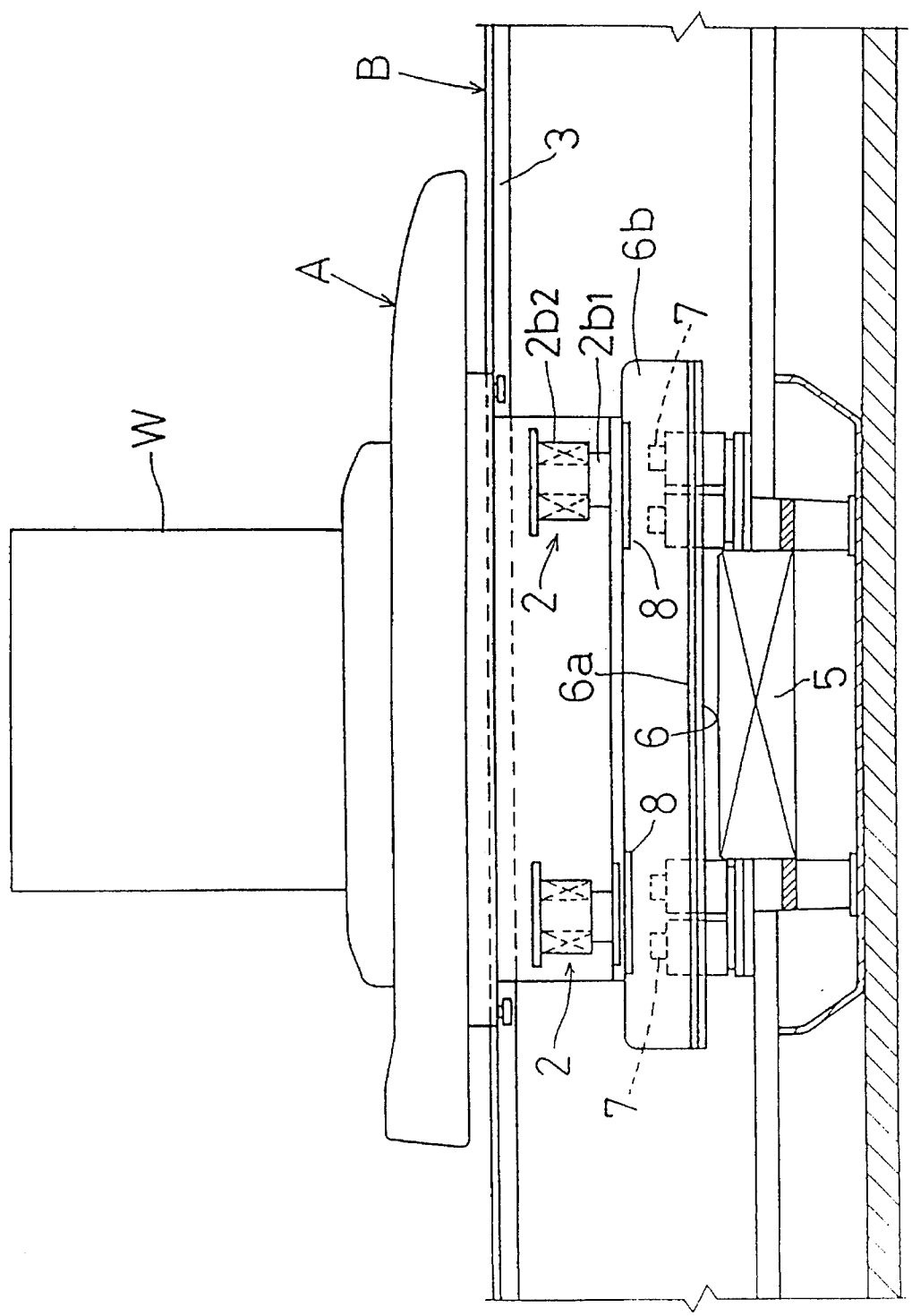
FIG. 15 is a side view showing construction of the vehicle and guide rail of FIG. 14.

As shown in FIGS. 14 and 15, the guide rail B has levitating magnetic members 3 attached to lower surfaces of upper horizontal flanges thereof to be attracted by electromagnets acting as magnetic force generating devices 2 of each vehicle A. The electromagnets 2 are mounted on a lower frame 1 of the vehicle A and distributed to four, front and rear and right and left, corners of the vehicle A. Each electromagnet 2 includes a U-shaped core $2b1$ having a pair of end faces opposed to one of the levitating magnetic members 3, and two coils $2b2$ connected in series and wound around two bobbins mounted on the core $2b1$.

A magnetic flux produced by the electromagnet 2 passes through a magnetic circuit including the core $2b1$, levitating magnetic member 3, and a pair of gaps formed between the two end faces of the core $2b1$ and magnetic member 3, to generate a magnetic force (attractive force) between the electromagnet 2 and magnetic member 3. As shown in FIG. 14, the levitating magnetic members 3 are magnetized in directions substantially at right angles to a running direction of the vehicle A (i.e. magnetized in right and left directions). Consequently, depending on directions of the magnetic fluxes produced by the electromagnets 2, the magnetic forces acting between the electromagnets 2 and levitating magnetic members 3 become repulsive forces. That is, when magnetic fluxes are produced in directions indicated by broken line arrows in FIG. 14, attractive forces are generated between the electromagnets 2 and levitating magnetic members 3. When magnetic fluxes are produced in directions opposite to the broken line arrows, repulsive forces are generated between the electromagnets 2 and levitating magnetic members 3.

Each electromagnet 2 includes a gap sensor 4 disposed centrally thereof to detect a gap between the vehicle A and guide rail B. The vehicle A includes a control device operable, in response to detection information received from the gap sensors 4, to control exciting currents supplied to the electromagnets 2 to control the magnetic forces of the electromagnets 2, thereby to control levitation of the vehicle A above the guide rail B. The control by the control device will be described later.

The guide rail B includes primary coils 5 mounted in the bottom thereof. Each vehicle A includes a secondary conductor 6 supported by the lower frame 1 through a prop $6b$. The primary coils 5 and secondary conductor 6 constitute a linear motor for driving the vehicle A. The secondary conductor 6 has a magnetic plate $6a$ applied thereto. The primary coils 5 produce magnetic fields to act on the secondary conductor 6 and propel the vehicle A.

The primary coils 5 are arranged at predetermined intervals along the guide rail B to save installation cost, and the vehicle A runs by inertia from one primary coil 5 to another. However, the primary coils 5 are, of necessity, arranged at and adjacent each station ST to decelerate the vehicle A to a standstill and to start and accelerate the vehicle A.

The guide rail B includes stopping electromagnets 7 arranged in positions opposed to each station ST to maintain the vehicle A at a standstill as magnetically levitated. The vehicle A includes stopping magnetic members 8 attached to the lower frame 1 to be attracted by the electromagnets 7. The magnetic members 8 are arranged in the front and rear and right and left corners of the vehicle A. Four electromagnets 7 are arranged in place opposite the station ST to act on the respective magnetic members 8.

Thus, the vehicle A is driven, under ground control, by the ground, primary type linear motor formed of the primary coils 5 and secondary conductor 6, and is stopped at each station ST and maintained still also under ground control. The controls of the primary coils 5 include deceleration, stoppage, starting and acceleration at and adjacent each station ST, and intermediate acceleration and deceleration between the stations ST. A ground controller effects these controls by varying direction and frequency of magnetic fields produced from the primary coils 5.

Figure 16:
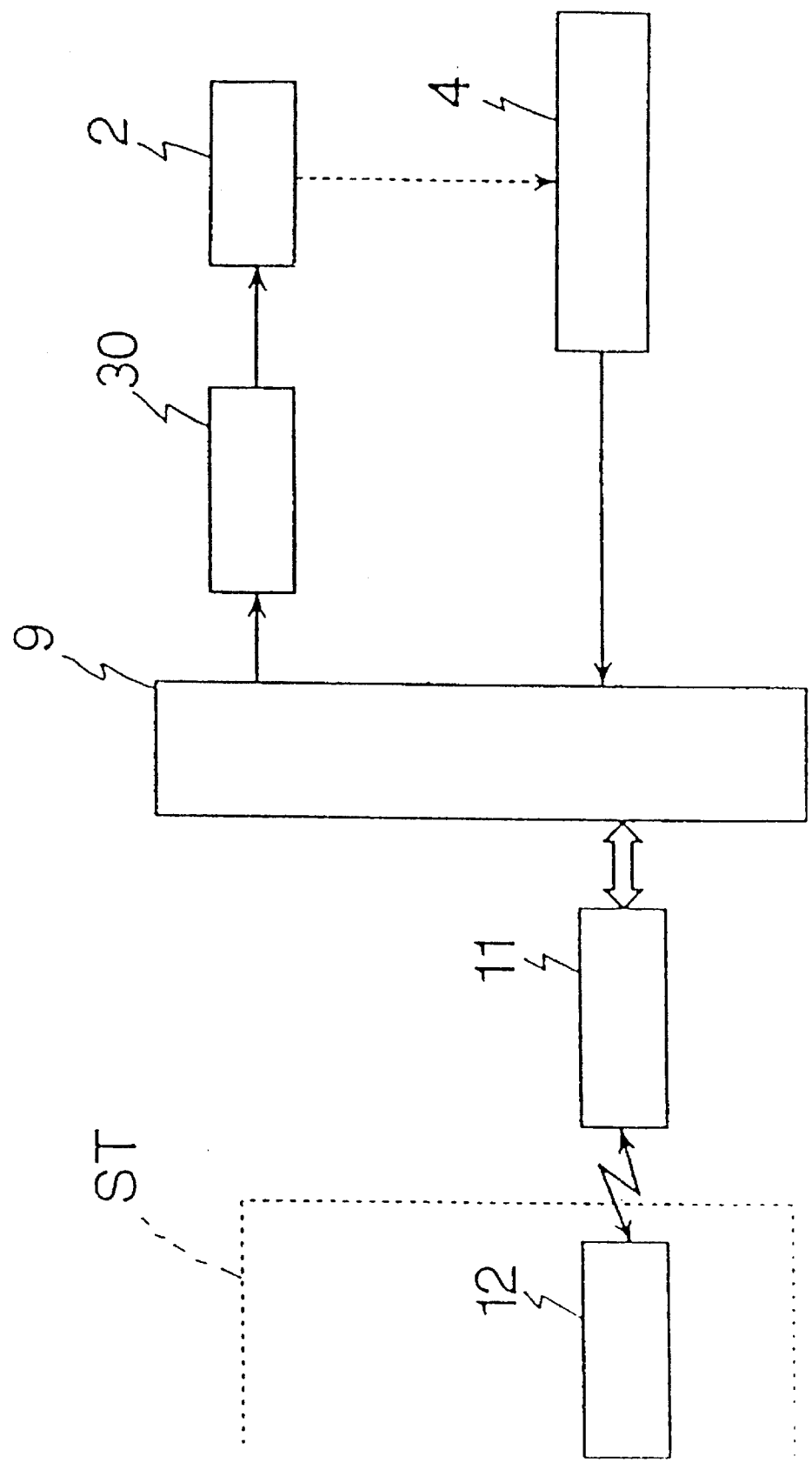
FIG. 16 is a block diagram showing controls effected by a control device of the vehicle shown in FIG. 14.

The vehicle A has a control device 9 mounted thereon. As shown in FIG. 16, the control device 9 has main functions to control, through a drive circuit 30, the exciting current supplied to the electromagnets 2, and to exchange information with each station ST through communication units 11 and 12 by means of optical communication. The information exchanged includes information regarding the identification number and load conditions of the vehicle A, information regarding charging and discharging of a battery, and information regarding running and stoppage of the vehicle A.

Though not shown in FIG. 16, a total of four drive circuits 30 are provided to drive the four electromagnets 2 arranged in the front and rear and right and left corners of the vehicle A, respectively. The control device 9 transmits information regarding polarity and amount of the exciting current to each of the four drive circuits 30. The control device 9 also receives detection information from four gap sensors 4 mentioned hereinbefore.

Based on the detection information received from the gap sensors 4, the control device 9 effects a feedback control to vary the exciting currents supplied to the electromagnets 2, to secure a proper gap between the vehicle A and guide rail B. That is, the control device 9 causes the attractive forces acting between the electromagnets 2 and levitating magnetic members 3 to balance the weight of the vehicle A including a load supported thereon. Thus, the heavier the load is, the greater becomes the exciting currents supplied to the electromagnets 2.

The weight of the vehicle A changes suddenly when transferring a load from a station ST to the vehicle A or vice versa. As a result, the vehicle A undergoes transient vertical vibrations until reinstatement of a normal, steady state in which the attractive force and weight are balanced. Further, the vehicle A may encounter vertical vibrations due to some disturbance during a run, particularly when carrying no load.

Figure 17:
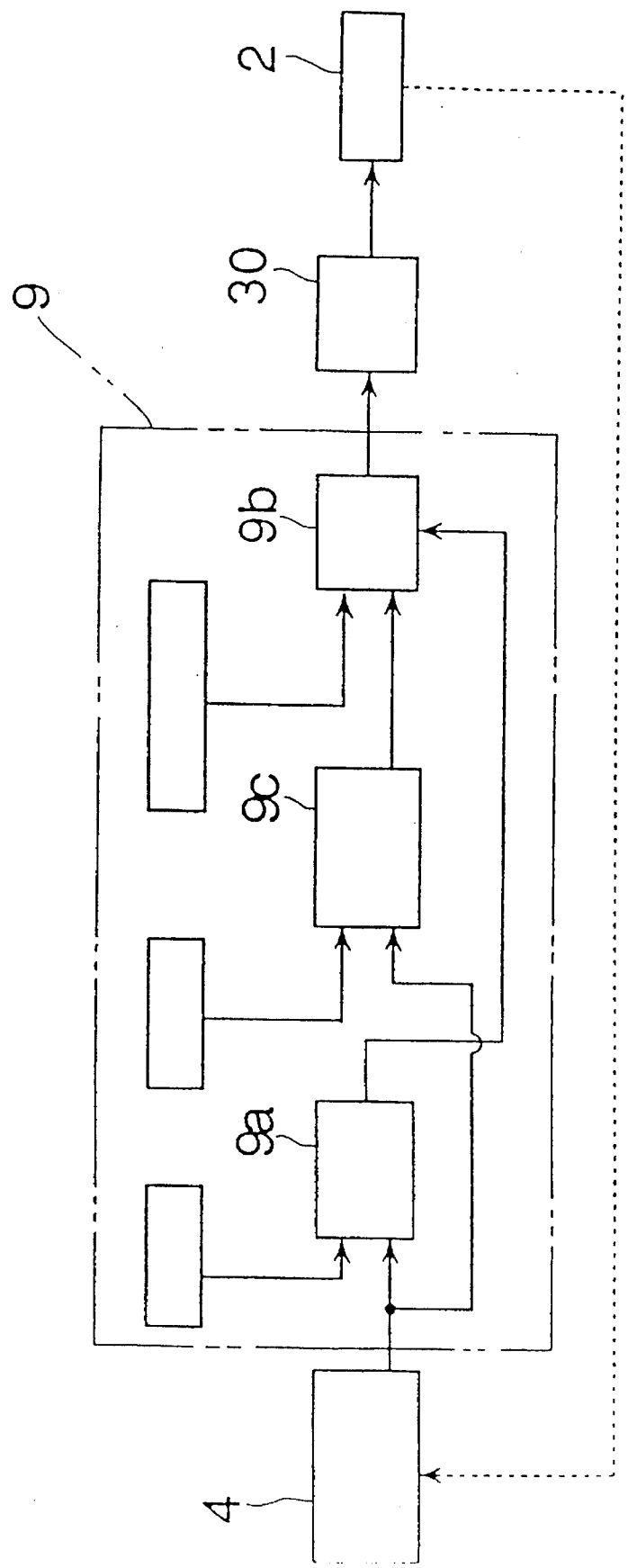
FIG. 17 is a block diagram showing control of exciting currents supplied to electromagnets shown in FIG. 14.

In the magnetic levitation transport system of this embodiment, the control device 9 effects a control in order to damp such vibrations quickly and to prevent the vehicle A from moving too close to the guide rail B and causing the electromagnets 2 to contact the levitating magnetic members 3. This control will be described with reference to the block diagram in FIG. 17.

The control device 9 includes a comparator circuit $9a$ for comparing a detection value from each gap sensor 4 with a predetermined lower limit value. If the detection value is less than the lower limit value, that is if the vehicle A is too close to the guide rail B, the control device 9 operates a switch circuit $9b$ to apply a predetermined repulsive current level to a drive circuit 30 and excite the electromagnet 2 with an exciting current of opposite polarity to normal. As a result, a magnetic flux is produced in the opposite direction to a broken line arrow in FIG. 14, to generate a repulsive force between the electromagnet 2 and levitating magnetic member 3. This repulsion generating current (i.e. the exciting current of opposite polarity) is a pulsed current lasting only a short time, and the control device 9 presently returns to the normal feedback control.

In the normal feedback control where the detection values are above the lower limit value, the control device 9 adjusts exciting currents of positive polarity based on the detection values from the gap sensors 4. Specifically, an operational amplifier circuit 9c outputs a deviation of the detection value of each gap sensor 4 from a predetermined target value, to the drive circuit 30 through the switch circuit 9b. The electromagnet 2 is excited by a current of positive polarity corresponding to the deviation. As a result, a magnetic flux is produced in the direction indicated by the broken line arrow in FIG. 14, to generate an attractive force between the electromagnet 2 and levitating magnetic member 3 which balances the weight of the vehicle A.

This embodiment may be modified as follows:

(1) In the described embodiment, a repulsion generating current level applied to the drive circuit 30 may be varied with reference to the weight of a load when the detection values of the gap sensors 4 are below the lower limit value, i.e. when the vehicle A has moved too close to the guide rail B. That is, vertical vibrations of the vehicle A are damped with increased speed by varying the repulsive forces generated between the electromagnets 2 and levitating magnetic members 3 according to an inertial force of the load. The weight of the load may be included in the load information communicated from station ST to vehicle A, for example.

(2) The mode of switching electrification of the electromagnets to switch the magnetic forces generated between the electromagnets and levitating magnetic members, between attractive forces and repulsive forces, is not limited to the polarity inversion of the exciting currents supplied to the electromagnets as in the foregoing embodiment. For example, each electromagnet may include a pair of coils wound in opposite directions for selective excitation.

(3) In the foregoing embodiment, the levitating magnetic members 3 are magnetized in right and left directions normal to the running direction of the vehicle A. Instead, the magnetic members may be magnetized vertically so that upper/lower surfaces present N/S-poles. In this case, each electromagnet employs an I-shaped core having one of the two end faces opposed to the levitating magnetic member.

(4) In the foregoing embodiment, the exciting current for the electromagnets 2 are varied based on the detection information from the gap sensors 4, to maintain a proper gap between the vehicle A and guide rail B. The present invention is applicable to what is called a zero power levitation control in which the exciting currents for the electromagnets 2 are fed back, and the proper gap is varied to bring the exciting currents to zero steady level. That is, the core 2b1 of each electromagnet 2 is formed of a material attracted by a levitating magnetic member 3 in the form of a permanent magnet, and this attractive force is used as a steady levitating magnetic force. It is also possible to use permanent magnets with the electromagnets 2 to obtain increased steady levitating magnetic forces in times of zero exciting current.

A further embodiment will be described hereinafter.

Figure 19:
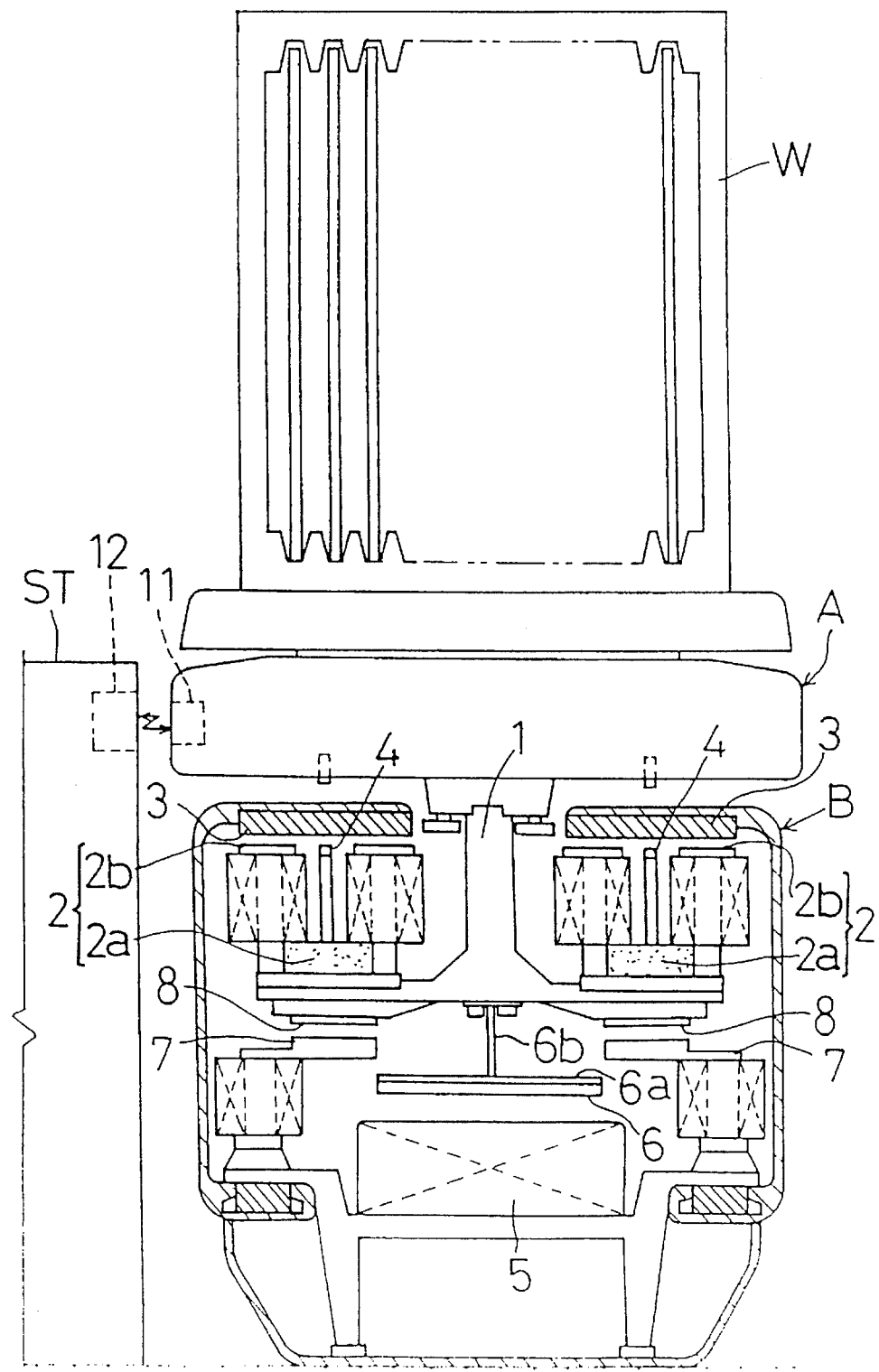
FIG. 19 is a sectional view of a vehicle and a guide rail in the magnetic levitation transport system shown in FIG. 18.
Figure 20:
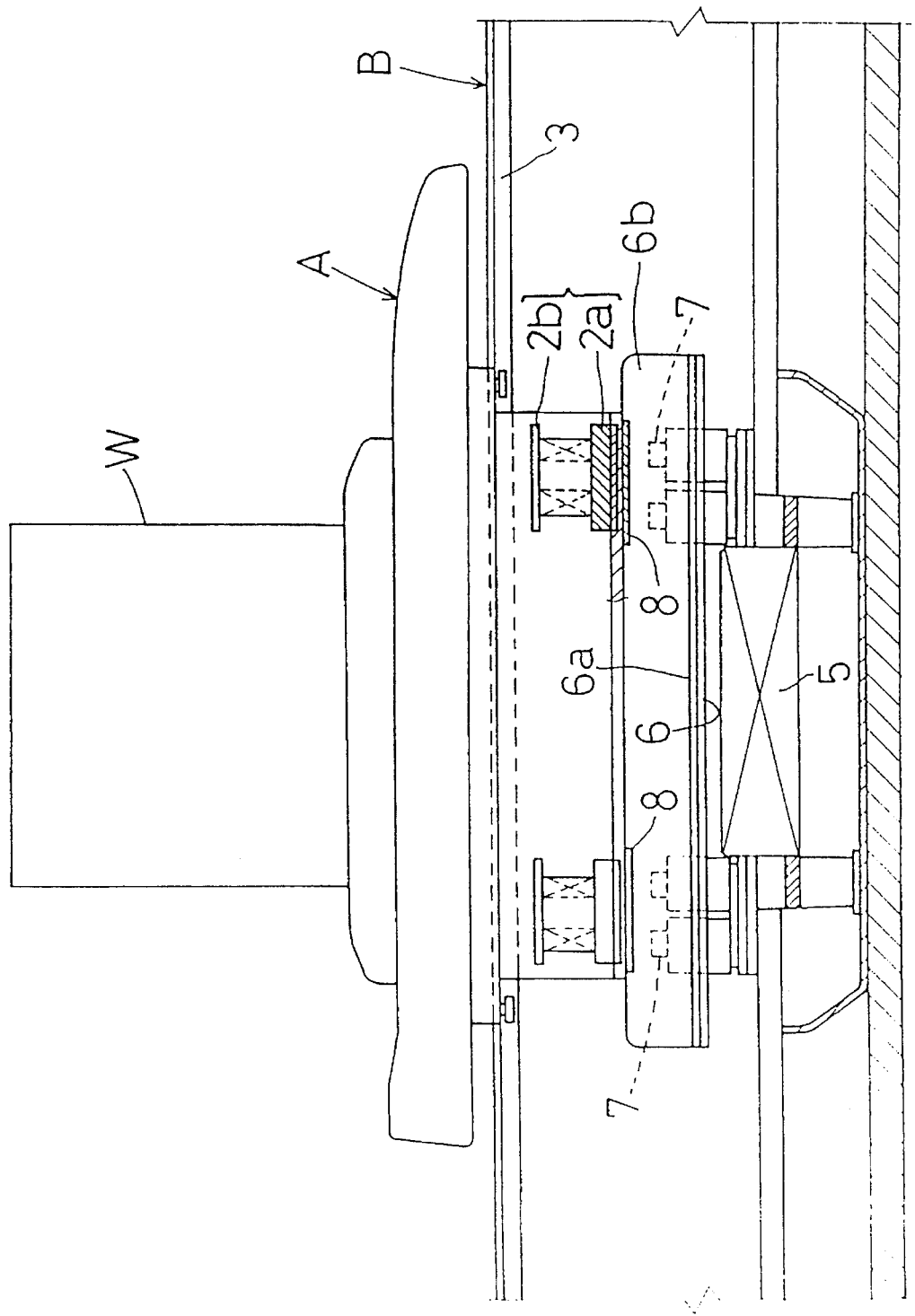
FIG. 20 is a side view showing construction of the vehicle and guide rail shown in FIG. 18.

FIGS. 19 and 20 show a construction for levitating a vehicle A above a guide rail B in this embodiment. The guide rail B has levitating magnetic members 3 attached to lower surfaces of upper horizontal flanges thereof to be attracted by magnetic force generating devices 2 of the vehicle A. The magnetic force generating devices 2 are mounted on a lower frame 1 of the vehicle A and distributed to four, front and rear and right and left, corners of the vehicle A. Each magnetic force generating device 2 includes a pair of electromagnets 2b and a permanent magnet 2a mounted on a yoke between the electromagnets 2b. The electromagnets 2b are in the form of coils connected in series and supplied with a predetermined exciting current.

A magnetic flux produced by the electromagnets 2b and permanent magnet 2a passes through a magnetic circuit including the permanent magnet 2a, yoke of the electromagnets 2b, levitating magnetic member 3, and a pair of gaps formed between two end faces of the yoke and magnetic member 3, to generate a magnetic force (attractive force) between the magnetic force generating device 2 and magnetic member 3. The magnetic force of the permanent magnet 2a and that of the electromagnets 2b have a mutually boosting effect where the permanent magnet 2a and electromagnets 2b produce magnetic fluxes in the same direction, but attenuate each other where the magnetic fluxes are produced in opposite directions.

Thus, the attractive force acting between the magnetic force generating device 2 and levitating magnetic member 3 may be varied with respect to the magnetic force of the permanent magnet 2a by varying the exciting current supplied to the coils of electromagnets 2b between opposite polarities across zero. That is, the permanent magnets 2a are utilized to levitate the vehicle A while saving power consumed by the electromagnets 2b. This levitation control will be described later.

A construction for propelling the vehicle A forward and backward along the guide rail B will be described next.

The guide rail B includes primary coils 5 mounted in the bottom thereof, while each vehicle A includes a secondary conductor 6 supported by the lower frame 1 through a prop 6b. The primary coils 5 and secondary conductor 6 constitute a linear motor for driving the vehicle A. The secondary conductor 6 has a magnetic plate 6a applied thereto. The primary coils 5 produce magnetic fields to act on the secondary conductor 6 and propel the vehicle A.

The primary coils 5 are arranged at predetermined intervals along the guide rail B to save installation cost. The vehicle A receives a forward or backward thrust from a primary coil 5 when passing over it, and runs by inertia to a next primary coil 5. However, the primary coils 5 are, of necessity, arranged at and adjacent each station ST to decelerate the vehicle A to a standstill and to start and accelerate the vehicle A.

The guide rail B includes stopping electromagnets 7 arranged in positions opposed to each station ST to maintain the vehicle A at a standstill as magnetically levitated. The vehicle A includes stopping magnetic members 8 attached to the lower frame 1 to be attracted by the electromagnets 7. The magnetic members 8 are arranged in the front and rear and right and left corners of the vehicle A. Four electromagnets 7 are arranged in place opposite the station ST to act on the respective magnetic members 8.

Controls of the magnetic force generating devices 2 of the vehicle A and the primary coils 5 acting as propelling force generating means will be described with reference to FIG. 18.

Figure 18:
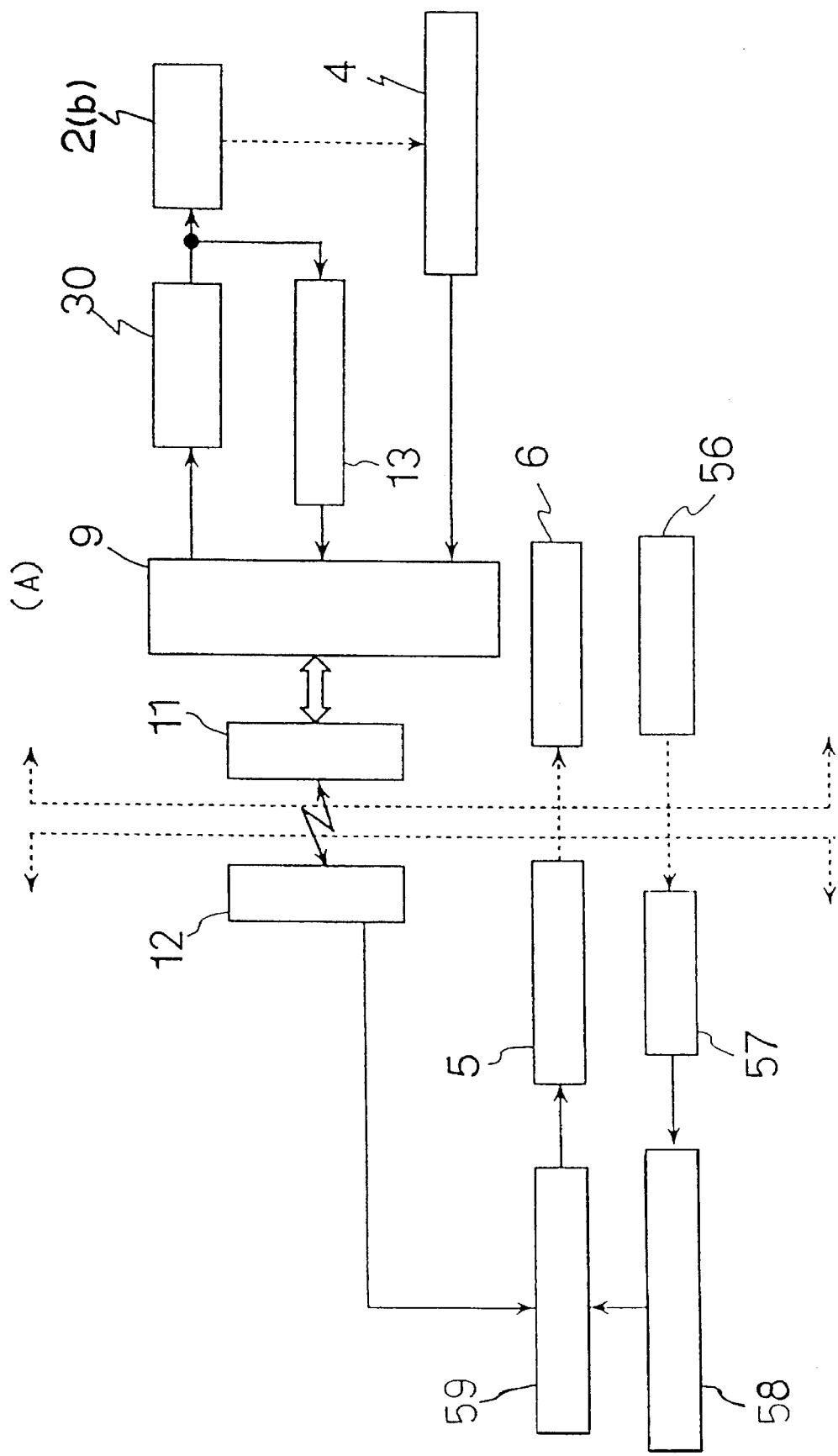
FIG. 18 is a block diagram of a principal portion of a magnetic levitation transport system in a further embodiment of the invention.

As shown in FIG. 18, a levitation control device 9 mounted on the vehicle A controls, through a drive circuit 30, the exciting current supplied to the electromagnet 2b, thereby to control the levitating force of the magnetic force generating device 2.

The exciting current for the electromagnet 2b is fed back to the levitation control device 9 through a current detecting circuit 13. As shown in FIG. 19, the vehicle A includes gap sensors 4 each disposed centrally of the magnetic force generating device 2 for detecting a gap between the vehicle A and guide rail B. These gap sensors 4 transmit detection signals to the levitation control device 9. Though not shown in FIG. 18, the drive circuit 30 and current detecting circuit 13 are provided for each magnetic force generating device 2.

The levitation control device 9 controls the exciting currents for the electromagnets 2b, i.e. the levitating forces of the magnetic force generating devices 2, based on detection information from the current detecting circuits 13 and gap sensors 4 constituting a levitated state detecting device for detecting a difference between an actual levitated state and a predetermined proper levitated state. Specifically, the levitation control device 9 effects what is called a zero power levitation control to bring the exciting currents for the electromagnets 2b to zero (predetermined proper level) in a steady state where the gap sensors 4 detect no variation in the gap.

In the steady state, the vehicle A is levitated above the guide rail B with a gap therebetween determined only by the magnetic forces of the permanent magnets 2a. The exciting currents for the electromagnets 2b are varied within a very small range between opposite polarities across zero when variations occur with the above gap.

In the zero power levitation control, the gap in the steady state is variable with variations in the weight of the vehicle A including a load W. When the weight increases, for example, the vehicle A first sinks to increase the gaps detected by the gap sensors 4. Then, the levitation control device 9 acts to increase the exciting currents for the electromagnets 2b in a direction to compensate for the increase in the gaps. Even after an original gap is restored, the exciting currents are allowed to flow to cope with the increase in the weight. Consequently, the electromagnets 2b are excited in a direction to diminish the gap, to establish a steady state in which the exciting currents become zero for a smaller gap than the original gap. That is, an increase in the weight results in a diminished gap in the steady state.

Thus, the detection values of the gap sensors 4 in the steady state in which the zero power levitation is established correspond to state values variable with variations in the weight of the vehicle A, and the gap sensors 4 correspond to state value detecting means. The magnetic levitation transport system in this embodiment uses these state values in controlling the forward or backward propelling force applied to the vehicle A, to realize substantially constant acceleration and deceleration regardless of the weight of the load W.

Under the condition of a fixed forward or backward propelling force, acceleration (or deceleration) is variable with variations in the weight of the vehicle A including the load W according to Newton's second law. This is undesirable since variable acceleration (or deceleration) time occurs before attaining a desired speed. Difficulties are encountered particularly in controlling deceleration and stoppage of the vehicle A. To eliminate this inconvenience, the forward or backward propelling force is varied in proportion to the state values corresponding to the weight of the vehicle A, to obtain constant acceleration (or deceleration) regardless of weight variations. This aspect will be described with reference to FIG. 18.

As shown in FIG. 18, the state values detected by the gap sensors 4 acting as the state value detecting means, or more precisely state values the levitation control device 9 derives from the detection values of the gap sensors 4 in the steady state, are transmitted to a propelling force control device 59 through communication units 11 and 12. The communication units 11 and 12 are infrared type bidirectional communication units mounted on the vehicle A and the ground (such as each station ST), respectively. These communication units are used to exchange information regarding the identification number of the vehicle A, information regarding charging and discharging of a battery, and information regarding starting and stoppage of the vehicle A, as well as the above state values.

The propelling force control device 59 controls direction and magnitude of the propelling force which the primary coils 5 acting as propelling force generating means apply to the vehicle A through the secondary conductor 6. The direction of the propelling force applied to vehicle A is switched by switching the direction of magnetic fields induced by the primary coils 5. Thus, a forward propelling force or backward propelling force is selectively applied to the passing vehicle A to accelerate or decelerate the vehicle A.

Since the primary coils 5 are arranged in spaced relations as noted hereinbefore, it is inefficient to accelerate or decelerate the vehicle A by varying frequency. Instead of varying frequency, an AC voltage applied to the primary coils 5 is subjected to phase control to vary effective voltage, thereby varying magnitude of the propelling force (torque).

Propelling force control devices 59 for controlling intermediate accelerating primary coils 5 arranged between stations ST vary the effective voltage in proportion to the state values (the weight of vehicle A and load W) transmitted from the vehicle A through the communication units 11 and 12. As a result, the magnitude of the propelling force the primary coils 5 apply to the vehicle A is adjusted to a proper value according to the weight of the load W.

Similarly, a propelling force control device 59 for controlling a decelerating primary coil 5 disposed upstream of each station ST, and a propelling force control device 59 for controlling an accelerating primary coil 5 disposed immediately downstream of each station ST, also vary the effective voltage to be applied to the primary coils 5 in proportion to the state values. In this way, substantially constant deceleration (or acceleration) is obtained regardless of variations in the weight of the load W.

A propelling force control device 59 for controlling a primary coil 5 opposed to each station ST effects the following control in order to cause the vehicle A to stop smoothly at a predetermined position. Though not shown in FIG. 19, the vehicle A includes a slit plate (referenced 56 in FIG. 18) elongated in the fore and aft direction and mounted laterally of the lower frame 1, while the guide rail B includes an optical sensor (photo interrupter) 57 having a light emitter and a light receiver defining a space therebetween through which the slit plate is movable. The slit plate defines slits for allowing passage of light of the optical sensor therethrough and non-slit portions for shielding the light, which are arranged alternately at fixed intervals. The slit plate and optical sensor 57 constitute a linear encoder.

A position/speed detecting device 58 included in a control device of each station ST derives a current position and current speed of the vehicle A from a detection signal received from the optical sensor 57, and applies this information to the propelling force control device 59. Based on the current position and speed of the vehicle A, the propelling force control device 59 controls the effective voltage applied to the primary coil 5 to slow down the vehicle A gradually to be at creep speed a little before a stopping position. That is, the effective voltage applied to the primary coil 5 is gradually lowered based on a distance from the current position to the stopping position and a difference between the current speed and a predetermined proper speed. When a current position of the vehicle A decelerated to creep speed agrees with the stopping position, the stopping electromagnets 7 mentioned hereinbefore are excited to hold the vehicle A at the stopping position.

In the above stopping control also, the effective voltage applied to the primary coil 5 must be varied in proportion to the state values corresponding to the vehicle A including the load W. In practice, this is achieved by varying, by degrees and according to the state values, gain in feedback control of the effective voltage applied to the primary coil 5, based on a difference between the proper speed and current speed.

This embodiment may be modified as follows:

(1) The levitation control in the above embodiment is what is called zero power control to bring the exciting currents for the electromagnets to zero in the steady state. The present invention is not limited to such control, but may allow certain exciting currents to flow to the electromagnets in the steady state. This is a control for maintaining energy supplied to the magnetic force generating devices at a predetermined proper value.

(2) The invention is applicable where a levitation control is effected to control the levitating force of the magnetic force generating devices to secure a predetermined proper gap between the vehicle and guide rail despite variations in the weight of the load (and vehicle A). This is a case where the levitation control device 9 controls the exciting currents supplied to the electromagnets 2b based on a difference between the predetermined proper gap and the gap detected by the gap sensors 4 acting as levitated state detecting means. In this case, the current detecting circuits 13 correspond to the state value detecting device for detecting the levitating force of the magnetic force generating device, and detect state values (exciting current levels) corresponding to the weight of the load (and the vehicle).

(3) The state value detecting device for detecting state values variable with variations in the weight of the vehicle does not have to use the gap sensors 4 and current detecting circuits 13 constituting the levitated state detecting device. The state value detecting device may employ gap sensors and the like provided specially for this purpose.

(4) Instead of providing communication units 12 for all positions where the primary coils are installed as in the foregoing embodiment, the communication units 12 may be provided only for the stations ST. Then, the state values transmitted from the vehicle A to each station ST may be transferred to the propelling force control devices of the primary coils adjacent to this station ST.

(5) The magnetic force generating devices and control devices therefor, and the state value detecting devices, may be installed on the ground. The present invention is applicable to such a case.

(6) Instead of deriving a weight from the state values detected in the predetermined proper levitated state as in the foregoing embodiment, a weight may be derived from state values detected during a transitional control process to the predetermined proper levitated state. That is, a variation in the gap resulting from a unit amount increase in the levitating force increases or decreases according to a weight, and therefore the weight may be derived from such variation.

What is claimed is:

1. A magnetic levitation transport system comprising:

a magnetic levitation vehicle;

lines extending through predetermined blocks of a running track of said vehicle to transmit a high frequency sine-wave current therethrough;

wherein said vehicle is driven by a linear motor, and includes levitating magnetic force generating means to attract levitating magnetic members extending along said running track, a pickup coil resonant with a frequency of said lines to generate an electromotive force, a power receiving unit connecting said pickup coil to said levitating magnetic force generating means, and a battery connected to said power receiving unit, with said power receiving unit receiving power from only said pickup coil and both charging said battery and supplying power to said levitating magnetic force generating means when said pickup coil is generating an electromotive force, with said power receiving unit receiving power from only said battery and supplying power to said levitating magnetic force generating means when said pickup coil is generating no electromotive force.

2. A magnetic levitation transport system as defined in claim 1, wherein said lines are included in induction line units installed in said predetermined blocks and extending along inner walls of a guide rail.

3. A magnetic levitation transport system as defined in claim 2, wherein each of said induction line units includes, besides one of said lines, an elongated bracket extending along said guide rail, and pairs of upper and lower horizontal hangers supported by said bracket and arranged at predetermined intervals along said guide rail, and a pair of plastic ducts attached to distal ends of said hangers and extending along said guide rail.

4. A magnetic levitation transport system as defined in claim 3, wherein each of said lines is a strand wire formed of thin insulated wires and connected to one of said ducts, and covered with an insulator.

5. A magnetic levitation transport system as defined in claim 1, wherein said levitating magnetic force generating means comprises electromagnets, said battery supplying power to said electromagnets in portions of said running track destitute of said lines.

6. A magnetic levitation transport system as defined in claim 1, wherein said levitating magnetic force generating means includes electromagnets and permanent magnets.

7. A magnetic levitation transport system as defined in claim 6, wherein said electromagnets and said permanent magnets are arranged opposite said levitating magnetic members, respectively.

8. A magnetic levitation transport system as defined in claim 7, wherein each of said permanent magnets is formed cylindrical to surround one of said electromagnets.

9. A magnetic levitation transport system as defined in claim 1, wherein said levitating magnetic force generating means includes a plurality of electromagnets, and said levitating magnetic members are magnetized substantially at right angles to a running direction of said vehicle, said vehicle further including control means for controlling magnetic forces of said electromagnets, said control means being operable to control electrification of said electromagnets such that magnetic forces acting between said electromagnets and said levitating magnetic members are switched between attractive forces and repulsive forces.

10. A magnetic levitation transport system as defined in claim 9, wherein each of said electromagnets includes a gap sensor mounted centrally thereof to detect a gap between said vehicle and said guide rail.

11. A magnetic levitation transport system as defined in claim 1, further comprising levitated state detecting means for detecting a difference between a predetermined proper levitated state and an actual levitated state provided by a levitating force of said levitating magnetic force generating means, levitation control means operable in response to detection information received from said levitated state detecting means to control the levitating force of said levitating magnetic force generating means, thereby to maintain said predetermined proper levitated state, propelling force generating means for applying a forward or backward propelling force to said vehicle along a guide rail, and propelling force control means for controlling said propelling force generating means.

12. A magnetic levitation transport system as defined in claim 11, further comprising state value detecting means for detecting a state value variable with variations in weight of said vehicle, said propelling force control means being operable in response to detection information received from said state value detecting means to control said forward or backward propelling force.

13. A magnetic levitation transport system as defined in claim 12, wherein said levitated state detecting means is operable to detect a difference between a predetermined proper value and energy supplied to said levitating magnetic force generating means, and variations in a gap between said vehicle and said guide rail, said levitation control means is operable to control the levitating force of said levitating magnetic force generating means to bring said energy supplied to said levitating magnetic force generating means to said predetermined proper value in the absence of variations in said gap, and said state value detecting means is operable to detect said gap.

14. A magnetic levitation transport system as defined in claim 11, wherein said levitated state detecting means is operable to detect a difference between a predetermined proper gap and an actual gap between said vehicle and said guide rail, said levitation control means is operable to control the levitating force of said levitating magnetic force generating means to bring said actual gap to said proper gap, and said state value detecting means is operable to detect the levitating force of said levitating magnetic force generating means.

15. A magnetic levitation transport system as defined in claim 11, wherein said levitated state detecting means includes current detecting circuits and gap sensors, the levitating force of said levitating magnetic force generating means being controllable based on detection information from said gap sensors.

16. A magnetic levitation transport system comprising:

a magnetic levitation vehicle;

lines extending through predetermined blocks of a running track of said vehicle to transmit a high frequency sine-wave current therethrough;

a station installed on said lines;

a first communication means provided on said vehicle; and a second communication means provided on said station;

wherein said vehicle is driven by a linear motor, and includes levitating magnetic force generating means to attract levitating magnetic members extending along said running track, a pickup coil resonant with a frequency of said lines to generate an electromotive force, a power receiving unit connecting said pickup coil to said levitating magnetic force generating means, and a battery connected to said power receiving unit;

with said power receiving unit receiving power from only said pickup coil and both charging said battery and supplying power to said levitating magnetic force generating means when said pickup coil is generating an electromotive force, and with said power receiving unit receiving power from only said battery and supplying power to said levitating magnetic force generating means when said pickup coil is generating no electromotive force; and with said first communication means and said second communication means communicating information, by means of optical communication, regarding identification, movement and load conditions of said vehicle, and charge of said battery.

* * * * *